(12) United States Patent
Miyamoto et al.

(10) Patent No.: US 10,894,315 B2
(45) Date of Patent: Jan. 19, 2021

(54) ROBOT CONTROLLER AND ROBOT SYSTEM

(71) Applicant: Seiko Epson Corporation, Tokyo (JP)

(72) Inventors: Yoshito Miyamoto, Matsumoto (JP); Tsuguya Kojima, Chino (JP); Toshiyuki Ishigaki, Sakata (JP)

(73) Assignee: Seiko Epson Corporation

( * ) Notice: Subject to any disclaimer, the term of this patent is extended or adjusted under 35 U.S.C. 154(b) by 354 days.

(21) Appl. No.: 15/984,738

(22) Filed: May 21, 2018

(65) Prior Publication Data

US 2018/0345484 A1    Dec. 6, 2018

(30) Foreign Application Priority Data

May 30, 2017 (JP) .................. 2017-107110

(51) Int. Cl.
  *B25J 9/00* (2006.01)
  *G05B 19/423* (2006.01)
  *B25J 9/16* (2006.01)
  *B25J 13/08* (2006.01)
  *B25J 19/02* (2006.01)

(52) U.S. Cl.
  CPC .......... *B25J 9/0081* (2013.01); *B25J 9/1692* (2013.01); *B25J 13/085* (2013.01); *B25J 13/088* (2013.01); *B25J 19/023* (2013.01); *G05B 19/423* (2013.01); *G05B 2219/45083* (2013.01)

(58) Field of Classification Search
  CPC .............. B25J 9/00; B25J 9/16; G05B 19/423
  See application file for complete search history.

(56) References Cited

U.S. PATENT DOCUMENTS

| | | | | |
|---|---|---|---|---|
| 2005/0276377 A1* | 12/2005 | Carol | ............... | A61N 5/1037 378/65 |
| 2007/0075048 A1* | 4/2007 | Kunisaki | ............... | B25J 9/1697 219/91.1 |
| 2008/0083716 A1* | 4/2008 | Shigeyoshi | .......... | B23K 9/0216 219/125.12 |
| 2009/0001056 A1* | 1/2009 | Takahashi | ............ | B23K 11/253 219/86.7 |
| 2012/0123590 A1* | 5/2012 | Halsmer | ............... | B25J 9/1656 700/264 |
| 2012/0190981 A1* | 7/2012 | Harris | .............. | A61B 5/150389 600/439 |
| 2013/0086801 A1* | 4/2013 | Mimura | ................. | B23P 21/00 29/720 |
| 2014/0205790 A1* | 7/2014 | Bach | ..................... | A44B 11/04 428/99 |
| 2016/0263710 A1* | 9/2016 | Yoshida | ................. | B23K 9/133 |

FOREIGN PATENT DOCUMENTS

JP  2005-334785 A  12/2005

* cited by examiner

*Primary Examiner* — Kira Nguyen
(74) *Attorney, Agent, or Firm* — Harness, Dickey & Pierce, P.L.C.

(57) ABSTRACT

A robot controller comprising a processor that is configured to execute computer-executable instructions so as to controls a robot including an arm capable of moving at least one of a target object and a discharger capable of discharging a discharge object to the target object, wherein the processor is configured to use a first position based on a jig removably attached to the discharger to generate teaching information on a position of the arm.

4 Claims, 17 Drawing Sheets

ROBOT CONTROLLER AND ROBOT SYSTEM

BACKGROUND

1. Technical Field

The present invention relates to a robot controller, and a robot system.

2. Related Art

To allow a robot including a discharger that discharges a discharge object to apply the discharge object onto a target object, research and development is underway.

In relation to the above subject, there is a known robot including a noncontact discharger capable of discharging a discharge object toward a target object with no contact between the discharger and the target object so that the robot can apply the discharge object onto a predetermined position on the target object (see JP-A-2005-334785).

To teach the robot the position of the noncontact discharger in the case where the discharger applies the discharge object onto the predetermined position on the target object, it is necessary to evaluate whether or not the position of the discharger coincides with a position that allows the discharger to discharge the discharge object to a desired position where a user desires to apply the discharge object. In the case of the robot of the related art, however, it is difficult in some cases to precisely evaluate whether or not the position of the discharger coincides with the dischargeable position. The robot cannot therefore precisely perform the work of applying the discharge object onto the predetermined position on the target object in some cases.

SUMMARY

An aspect of the invention is directed to a robot controller that controls a robot including a movable section capable of moving at least one of a target object and a discharger capable of discharging a discharge object to the target object, the robot controller including a generation section that uses a first position based on a jig removably attached to the discharger to generate teaching information on a position of the movable section.

According to the configuration described above, the robot controller uses the first position based on the jig removably attached to the discharger to generate the teaching information on the position of the movable section. The robot controller can therefore cause a robot to precisely perform a work of applying the discharge object onto a predetermined position on the target object.

In another aspect of the invention, the generation section may calculate the first position based on an output from a force detector provided in the movable section.

According to the configuration described above, the robot controller calculates the first position based on the output from the force detector provided in the movable section. The robot controller can therefore cause the robot to precisely perform the work of applying the discharge object onto the predetermined position on the target object by using the first position calculated based on the output from the force detector.

In another aspect of the invention, in the robot controller, the teaching information may contain information according to a shape based on the first position formed of at least three first positions.

According to the configuration described above, the robot controller uses the first position based on the jig removably attached to the discharger to generate the teaching information concerning the position of the movable section and containing information according to the shape based on at least three first positions. The robot controller can therefore cause the robot to precisely perform the work of applying the discharge object onto the predetermined position on the target object based on the teaching information containing the information according to the shape based on the at least three first positions.

In another aspect of the invention, in the robot controller, the shape may be a flat plane.

According to the configuration described above, the robot controller uses the first position based on the jig removably attached to the discharger to generate the teaching information concerning the position of the movable section and containing information according to the flat plane based on the at least three first positions. The robot controller can therefore cause the robot to precisely perform the work of applying the discharge object onto the predetermined position on the target object based on the teaching information containing the information according to the flat plane based on the at least three first positions.

In another aspect of the invention, in the robot controller, the generation section may be capable of generating the teaching information through direct teaching.

According to the configuration described above, the robot controller can generate the teaching information through direct teaching. The robot controller can therefore cause the robot to precisely perform the work of applying the discharge object onto the predetermined position on the target object based on the teaching information generated through the direct teaching.

In another aspect of the invention, in the robot controller, the first position may include a position of a marker provided on the jig.

According to the configuration described above, the robot controller uses the first position based on the jig removably attached to the discharger and including the position of the marker provided on the jig to generate the teaching information on the position of the movable section. The robot controller can therefore cause the robot to precisely perform the work of applying the discharge object onto the predetermined position on the target object by using the first position including the position of the marker provided on the jig.

In another aspect of the invention, in the robot controller, the teaching information may contain information representing a positional relationship that is determined by using a position of the marker detected with an imager and is a relative positional relationship between a position of the discharger and a position of the movable section.

According to the configuration described above, the robot controller uses the first position based on the jig removably attached to the discharger to generate the teaching information containing the information representing the positional relationship that is determined by using the position of the marker detected with the imager and is the relative positional relationship between the position of the discharger and the position of the movable section. The robot controller can therefore cause the robot to precisely perform the work of applying the discharge object onto the predetermined position on the target object based on the teaching information containing the information representing the positional relationship that is determined by using the position of the marker detected with the imager and is the relative positional relationship between the position of the discharger and the position of the movable section.

In another aspect of the invention, in the robot controller, the teaching information may contain information representing a positional relationship that is determined by using the position of the marker detected with an imager and a position of landing of the discharge object detected with the imager and is a relative positional relationship between the position of the marker and the position of landing.

According to the configuration described above, the robot controller uses the first position based on the jig removably attached to the discharger to generate the teaching information containing information representing the positional relationship that is determined by using the position of the marker detected with the imager and the position of landing of the discharge object detected with the imager and is the relative positional relationship between the position of the marker and the position of landing. The robot controller can therefore cause the robot to precisely perform the work of applying the discharge object onto the predetermined position on the target object based on the teaching information containing the information representing the positional relationship that is determined by using the position of the marker detected with the imager and the position of landing of the discharge object detected with the imager and is the relative positional relationship between the position of the marker and the position of landing.

In another aspect of the invention, in the robot controller, the jig has a variable length in a discharge direction that is a direction in which the discharger discharges the discharge object.

According to the configuration described above, the robot controller uses the first position based on the jig removably attached to the discharger and having a variable length in the discharge direction to generate the teaching information on the position of the movable section. The robot controller can therefore cause the robot to precisely perform the work of applying the discharge object onto the predetermined position on the target object by using the first position based on the jig removably attached to the discharger and having a variable length in the discharge direction.

In another aspect of the invention, in the robot controller, the generation section may generate the teaching information based on an output from a distance detector provided in the movable section and the first position.

According to the configuration described above, the robot controller generates the teaching information based on the output from the distance detector provided in the movable section and the first position. The robot controller can therefore cause the robot to precisely perform the work of applying the discharge object onto the predetermined position on the target object based on the output from the distance detector provided in the movable section and the first position.

Another aspect of the invention is directed to a robot controlled by any of the robot controllers described above.

According to the configuration described above, the robot is controlled based on the teaching information concerning the position of the movable section and generated by using the first position based on the jig removably attached to the discharger. The robot can therefore precisely perform the work of applying the discharge object onto the predetermined position on the target object.

Another aspect of the invention is directed to a robot system including any of the robot controllers described above, a robot controlled by the robot controller, and the discharger.

According to the configuration described above, the robot system uses the first position based on the jig removably attached to the discharger to generate the teaching information on the position of the movable section. The robot system can therefore cause the robot to precisely perform the work of applying the discharge object onto the predetermined position on the target object.

As described above, the robot controller and the robot system each use the first position based on the jig removably attached to the discharger to generate the teaching information on the position of the movable section. The robot system can therefore cause the robot to precisely perform the work of applying the discharge object onto the predetermined position on the target object.

The robot is controlled based on the teaching information concerning the position of the movable section and generated by using the first position based on the jig removably attached to the discharger. The robot can therefore precisely perform the work of applying the discharge object onto the predetermined position on the target object.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiment

An embodiment of the invention will be described below with reference to the drawings.

Configuration of Robot System

Figure 1:
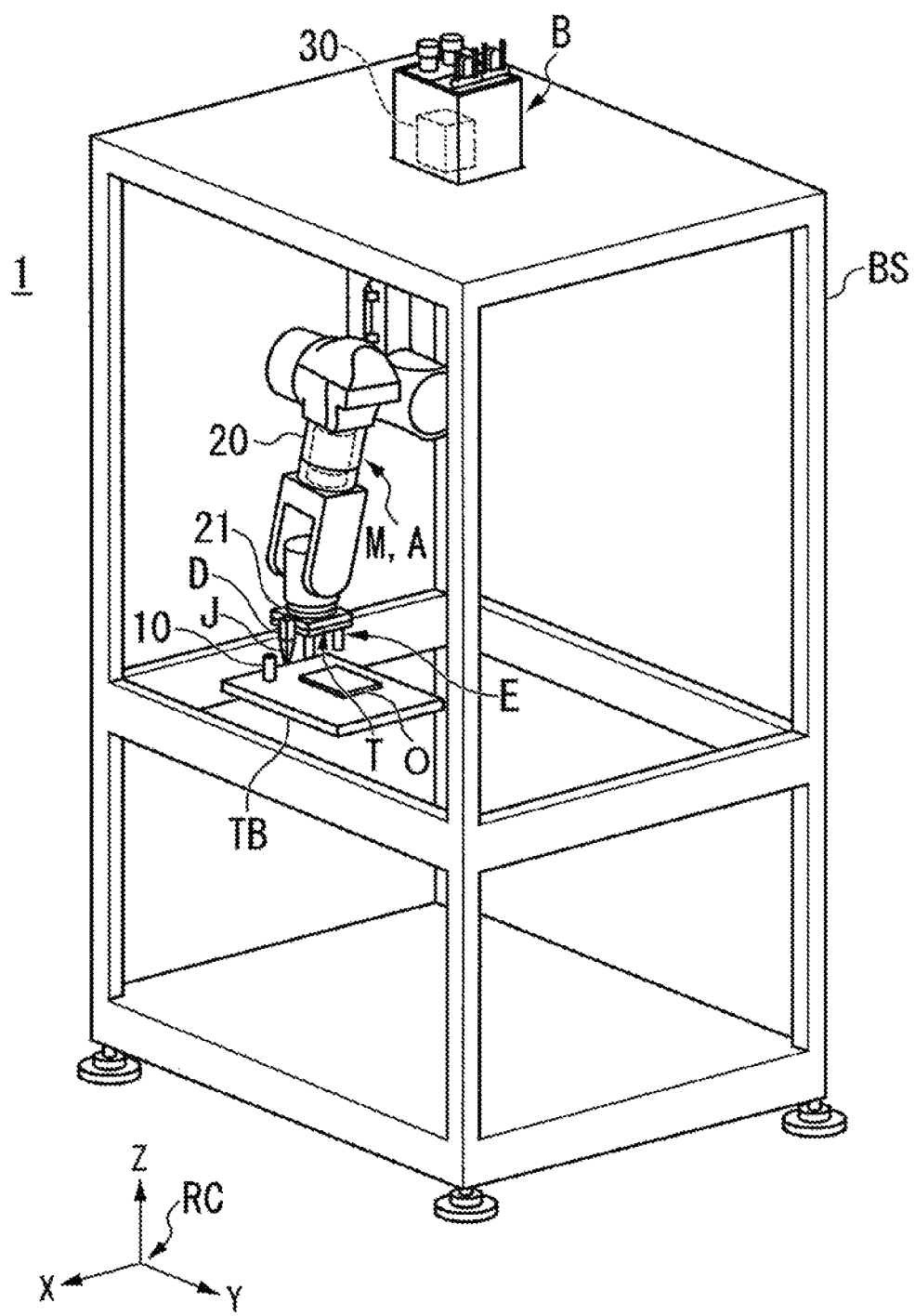
FIG. 1 shows an example of the configuration of a robot system according to an embodiment.
Figure 2:
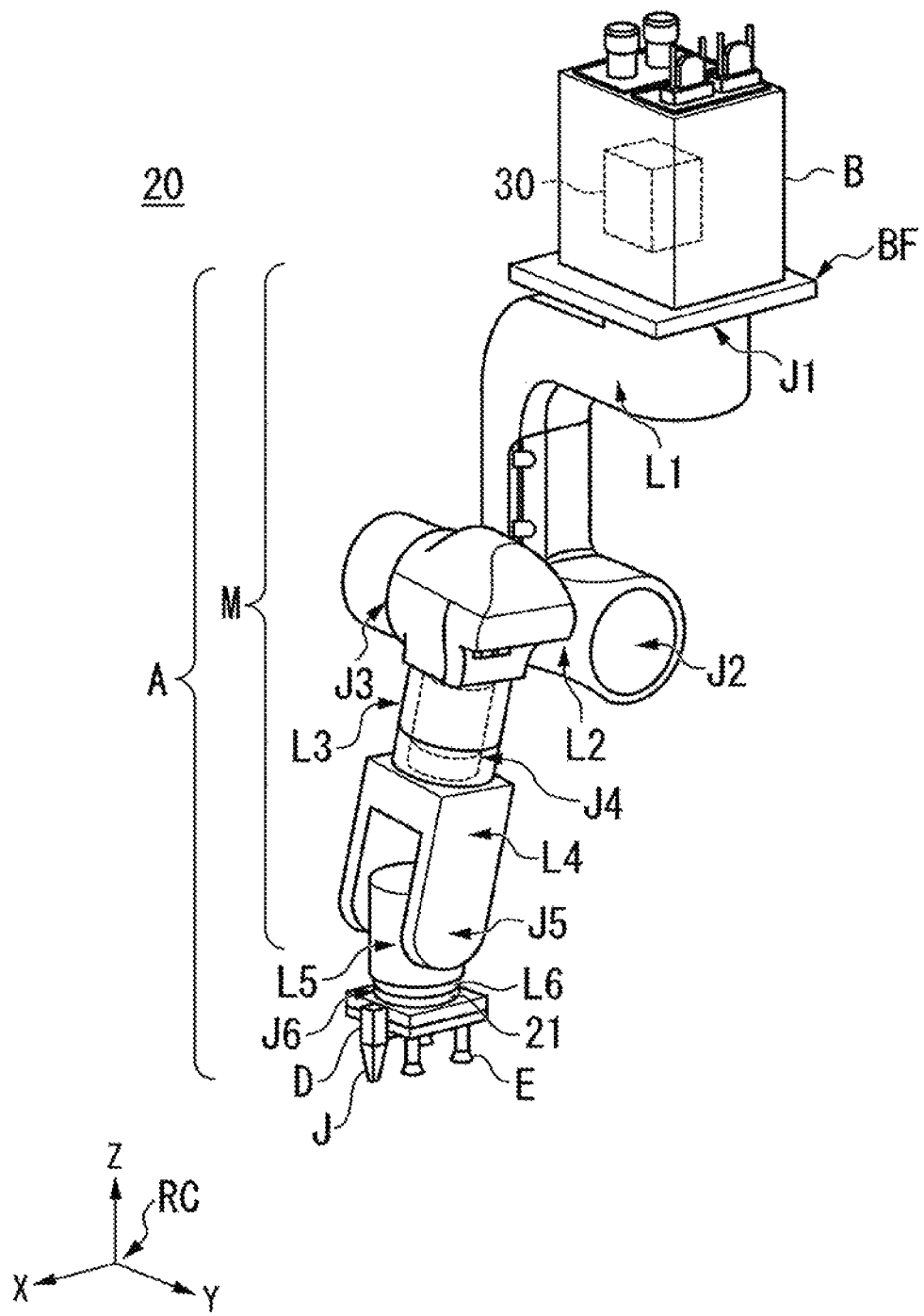
FIG. 2 shows an example of the configuration of a robot.

The configuration of a robot system 1 will first be described with reference to FIGS. 1 to 4. FIG. 1 shows an example of the configuration of the robot system 1 according to the embodiment. FIG. 2 shows an example of the configuration of a robot 20.

The robot system 1 includes, for example, a chassis BS, an imager 10, and the robot 20. The robot system 1 may further include, in addition to the components described above, a transporter that transports an object (such as another robot for transportation or a conveyer belt), an imager (a camera separate from robot 20, for example), a distance detector (laser displacement meter, for example), and other devices.

In the following description, the direction of gravity (vertically downward direction) is called a downward direction or downward, and the direction opposite the downward direction is called an upward direction or upward for ease of description. In the following sections, a case where the downward direction coincides with the negative direction of a Z axis in a robot coordinate system RC of the robot 20 will be described by way of example. It is, however, noted that the downward direction may not coincide with the negative direction.

The chassis BS is, for example, a frame made of a metal and having a box-like shape. The chassis BS does not necessarily have a box-like shape and may instead have a circularly columnar shape or any other shape. The chassis BS is not necessarily made of a metal and may instead be made of a resin or any other material. A flat plate is provided as a ceiling plate in a top portion of the chassis BS or the highest end portion of the end portions of the chassis BS. A flat plate is provided as a floor plate in a bottom portion of the chassis BS or the lowest end portion of the end portions of the chassis BS. The chassis BS is installed on an installation surface. The installation surface is, for example, a floor surface. The installation surface is not necessarily a floor surface and may instead be a wall surface, the ground, a ceiling surface, or any other surface. In the robot system 1, the robot 20 is installed on the ceiling plate of the chassis BS so that the robot 20 can perform predetermined work inside the chassis BS. The robot system 1 may instead include no chassis BS. In this case, the robot 20 is installed on a floor surface, a wall surface, or any other surface instead of the chassis BS.

A work bench TB, on which an object can be placed, is provided in the chassis BS. The work bench TB is so provided in the chassis BS as to be accommodated in a region where the robot 20, which will be described later, performs the work. In the example shown in FIG. 1, a target object O, which is an object on which the robot 20 performs the work, is placed on the upper surface of the work bench TB. The target object O is an industrial part or member to be incorporated into a product. The following description will be made of a case where the target object O is a flat plate to be incorporated into a product. The target object O is not necessarily an industrial part or member and may instead be an everyday item, a biological body, or any other object. The target object O does not necessarily have a flat-plate-like shape and may instead have a disc-like shape, a box-like shape, a circularly columnar shape, or any other shape. The imager 10 is provided on the upper surface of the work bench TB but on a surface different from the surface on which the target object O is placed.

The imager 10 is a camera including, for example, a CCD (charge coupled device) or a CMOS (complementary metal oxide semiconductor) device, which are each an imaging device that converts collected light into an electric signal. In this example, the imager 10 is provided on the upper surface of the work bench TB but on a surface different from the surface on which the target object O is placed in such a way that the direction along the optical axis from the imaging device toward a lens coincides with the upward direction. The imager 10 may capture a still image within the imageable range of the imager 10 or may capture motion images within the range.

The imager 10 is communicably connected to a robot controller 30 via a cable. The wired communication via the cable is performed in compliance, for example, with Ethernet (registered trademark), USB (universal serial bus), or any other standard. The imager 10 may instead be connected to the robot controller 30 over wireless communication performed in compliance with Wi-Fi (registered trademark) or any other communication standard.

The robot 20 is a single-arm robot including a base B, a movable section A, which is supported by the base B, and the robot controller 30. A single-arm robot is a robot including a single arm, such as the movable section A in this example. The robot 20 may be a multiple-arm robot in place of the single-arm robot. A multiple-arm robot is a robot including at least two arms (at least two movable sections A, for example). Among multiple-arm robots, a robot including two arms is also called a double-arm robot. That is, the robot 20 may be a double-arm robot including two arms or a multiple-arm robot including at least three arms (at least three movable sections A, for example). The robot 20 may still instead be a SCARA robot (horizontal multi-joint robot), an orthogonal coordinate robot, a cylindrical robot, or any other robot. An orthogonal coordinate robot is, for example, a gantry robot.

The base B has, for example, a roughly box-like shape having a longitudinal direction extending along the upward/downward direction. One of the surfaces of the base B is provided with a flange BF. The movable section A is provided on the flange BF. That is, the base B supports the movable section A via the flange BF. The base B does not necessarily have the shape described above and may have a cubic shape, a circularly columnar shape, a polyhedral shape, or any other shape capable of supporting the movable section A.

In the following description, the surface provided with the flange BF out of the surfaces of the base B is called an upper surface, and the surface opposite the surface provided with the flange BF out of the surfaces of the base B is called a lower surface for ease of description. The base B is, for example, so installed on the ceiling plate that the direction from the lower surface of the base B toward the upper surface of the base B coincides with the downward direction described above, that is, the entire work region of the robot 20 is located below the ceiling plate. Specifically, for example, the ceiling plate has an opening which is not shown but passes through the ceiling plate in the upward/downward direction and into which the base B is insertable. The opening is smaller than the flange BF. A user can install the base B on the ceiling plate (attach base B to ceiling plate) by fixing the flange BF to the ceiling plate with a plurality of bolts. That is, a plurality of through holes into which the plurality of bolts are inserted are formed in each of the flange BF and the ceiling plate. The base B may instead be installed in another position in the chassis BS. Further, the method for fixing the flange BF to the ceiling plate may be any other method.

The movable section A includes a manipulator M, an end effector E, a force detector 21, and a discharger D.

The manipulator M includes six arms, a first arm L1 to a sixth arm L6, and six joints, joints J1 to J6. The base B and the first arm L1 are linked to each other via the joint J1. The first arm L1 and the second arm L2 are linked to each other via the joint J2. The second arm L2 and the third arm L3 are linked to each other via the joint J3. The third arm L3 and the fourth arm L4 are linked to each other via the joint J4. The fourth arm L4 and the fifth arm L5 are linked to each other via the joint J5. The fifth arm L5 and the sixth arm L6 are linked to each other via the joint J6. That is, the movable section A including the manipulator M is a six-axis vertical multiple-joint arm. The movable section A may instead act around axes at a degree of freedom smaller than or equal to five or greater than or equal to seven.

The first arm L1 is pivotable around a first pivotal axis AX1 (see FIG. 3, for example), which is the pivotal axis of the joint J1. The second arm L2 is pivotable around a second pivotal axis AX2 (see FIG. 3, for example), which is the pivotal axis of the joint J2. The third arm L3 is pivotable around a third pivotal axis AX3 (see FIG. 3, for example), which is the pivotal axis of the joint J3. The fourth arm L4 is pivotable around a fourth pivotal axis AX4 (see FIG. 3, for example), which is the pivotal axis of the joint J4. The fifth arm L5 is pivotable around a fifth pivotal axis AX5 (see FIG. 3, for example), which is the pivotal axis of the joint J5. The sixth arm L6 is pivotable around a sixth pivotal axis AX6 (see FIG. 3, for example), which is the pivotal axis of the joint J6.

Figure 3:
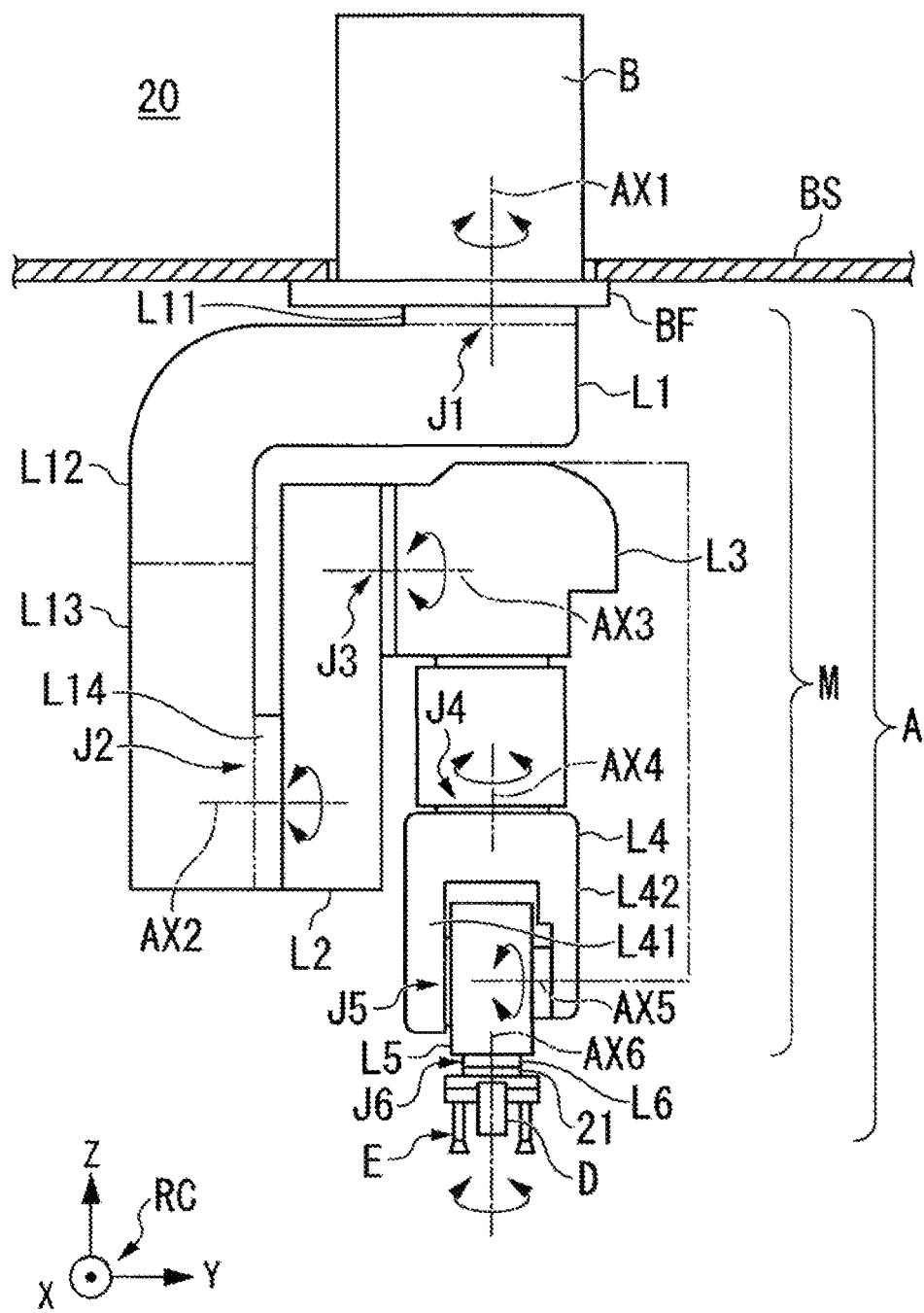
FIG. 3 is an exemplary side view of the robot shown in FIGS. 1 and 2.
Figure 4:
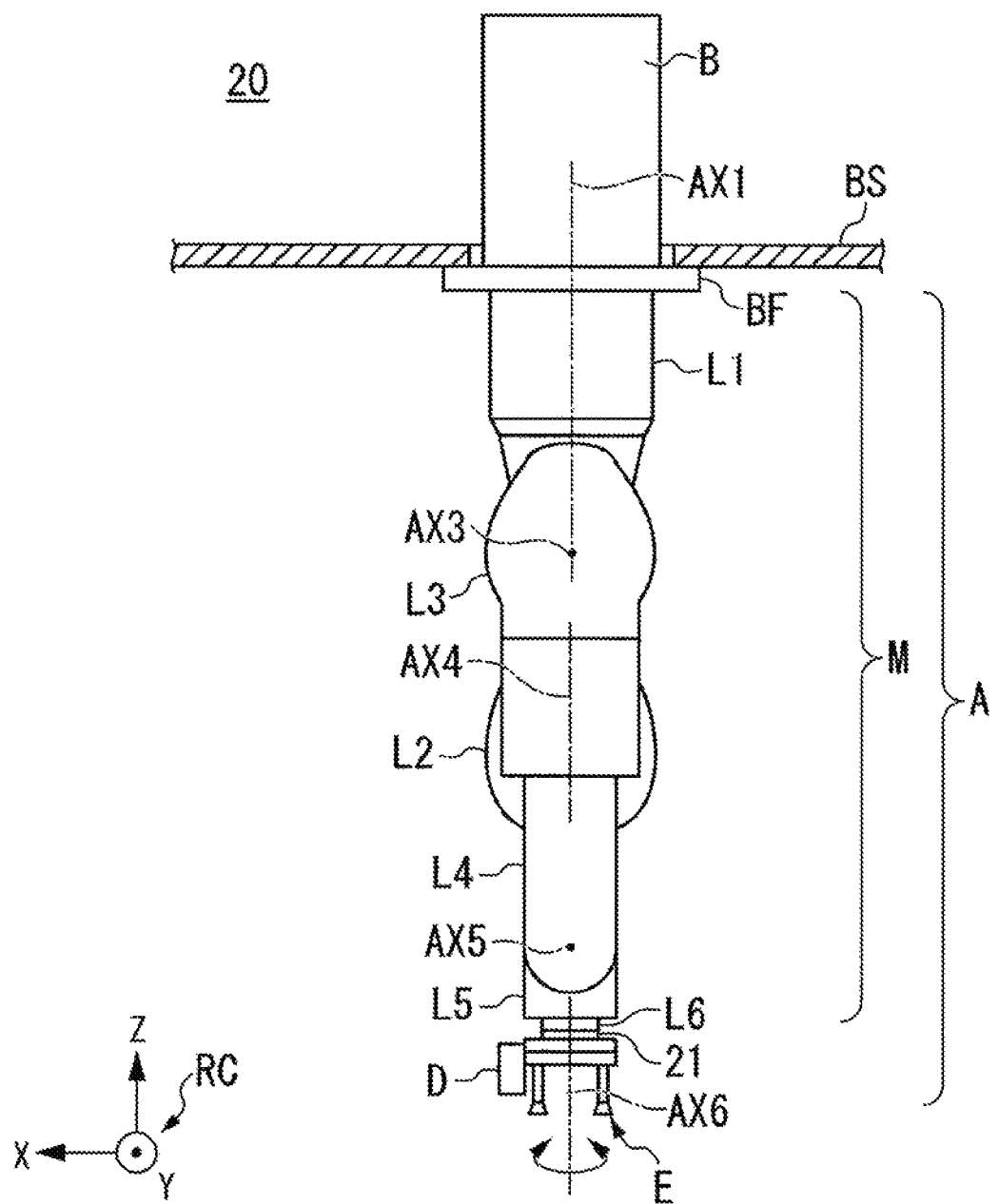
FIG. 4 is an exemplary front view of the robot shown in FIG. 3 when the robot is viewed from the positive side of a Y axis in a robot coordinate system toward the negative side of the Y axis.

The manipulator M will now be described in more detail with reference to FIGS. 3 to 5. FIG. 3 is an exemplary side view of the robot 20 shown in FIGS. 1 and 2.

Since the direction from the lower surface of the base B toward the upper surface of the base B coincides with the downward direction, the joint J2 is located below the joint J1, as shown in FIG. 3. The joint J2 is not located on an extension of the first pivotal axis AX1 because the first arm L1 has a bent shape. In this example, the first arm L1 is so curved as to have a rounded roughly L-letter shape when the robot 20 is viewed in the direction from the positive side of the X axis toward the negative side thereof in the robot coordinate system RC. Specifically, the first arm L1 is formed of four portions, portions L11 to L14. Out of the four portions that form the first arm L1, the portion L11 is a portion that extends from the base B downward along the first pivotal axis AX1 in FIG. 3. Out of the four portions, the portion L12 is a portion that extends from the lower end of the portion L11 along the second pivotal axis AX2 toward the negative side of the Y axis in the robot coordinate system RC. Out of the four portions, the portion L13 is a portion that extends from one of the ends of the portion L12 or the end opposite the portion L11 downward along the first pivotal axis AX1. Out of the four portions, the portion L14 is a portion that extends from one of the ends of the portion L13 or the end opposite the portion L12 along the second pivotal axis AX2 toward the positive side of the Y axis. The portions L11 to L14 may be integrated with one another into the first arm L1 or may be separate from one another but form the first arm L1. In FIG. 3, the portions L12 and L13 are roughly perpendicular to each other when the robot 20 is viewed along the X axis in the robot coordinate system RC.

The second arm L2 has an elongated shape. The second arm L2 is connected to the front end of the first arm L1, that is, one of the ends of the portion L14 or the end opposite the portion L13.

The third arm L3 has an elongated shape. The third arm L3 is connected to one of the ends of the second arm L2 or the end opposite the end connected to the first arm L1.

The fourth arm L4 is connected to the front end of the third arm L3, that is, one of the ends of the third arm L3 or the end opposite the end to which the second arm L2 is connected. The fourth arm L4 includes supports L41 and L42, which are a pair of supports facing each other. The supports L41 and L42 are used to connect the fourth arm L4 to the fifth arm L5. That is, the fourth arm L4 allows the fifth arm L5 to be located between the supports L41 and L42, and the supports L41 and L42 connect the fourth arm L4 to the fifth arm L5. The fourth arm L4 is not necessarily configured as described above and may include one support that supports the fifth arm L5 (cantilever configuration) or may include at least three supports that support the fifth arm L5.

The fifth arm L5 is located between the supports L41 and L42 and connected to the supports L41 and L42, as described above.

The sixth arm L6 has a flat-plate shape. That is, the sixth arm L6 is a flange. The sixth arm L6 is connected to one of the ends of the fifth arm L5 or the end opposite the fourth arm L4. The end effector E is connected to the end of the sixth arm L6 via the force detector 21. Specifically, the force detector 21 is provided between the sixth arm L6 and the end effector E.

In this example, out of the pivotal axes of the six joints provided in the manipulator M, the second pivotal axis AX2 and the third pivotal axis AX3 are parallel to each other. The second pivotal axis AX2 and the third pivotal axis AX3 may instead be not parallel to each other.

The first arm L1 and the second arm L2 of the manipulator M are allowed to overlap with each other when viewed in the axial direction of the first pivotal axis AX1. Further, the first arm L1 and the second arm L2 of the manipulator M are allowed to overlap with each other when viewed in the axial direction of the second pivotal axis AX2. The second arm L2 and the third arm L3 of the manipulator M are allowed to overlap with each other when viewed in the axial direction of the second pivotal axis AX2. The fourth arm L4 and the fifth arm L5 of the manipulator M are allowed to overlap with each other when viewed in the axial direction of the fourth pivotal axis AX4. In the present embodiment, the situation in which two arms overlap with each other when the two arms are viewed in a certain direction means that the area where one of the two arms overlaps with the other is at least a predetermined proportion of the area of the other arm. The predetermined proportion is, for example, 90%, but not necessarily, and may be any proportion. The manipulator M may be so configured that the third arm L3 and the fourth arm L4 are allowed to overlap with each other when viewed in the axial direction of the third pivotal axis AX3. Further, the manipulator M may be so configured that the fifth arm L5 and the sixth arm L6 are allowed to overlap with each other when viewed in the axial direction of the fifth pivotal axis AX5.

The manipulator M can be made compact by causing the joints J2 and J3 to pivot. In this example, the compact state is not only the state in which the distance between the second pivotal axis AX2 and the fifth pivotal axis AX5 is minimized in the direction along the first pivotal axis AX1 but the state in which the first pivotal axis AX1 and the fourth pivotal axis AX4 coincide with each other. That is, the state of the manipulator M shown in FIG. 3 is the compact state. When the robot 20 shown in FIG. 3 is viewed from the positive side of the Y axis toward the negative side of the Y axis in the robot coordinate system RC, the following three arms of the manipulator M in the compact state, the first arm L1, the second arm L2, and the third arm L3, overlap with one another, as shown in FIG. 4. FIG. 4 is an exemplary front view of the robot 20 shown in FIG. 3 when the robot 20 is viewed from the positive side of the Y axis toward the negative side of the Y axis in the robot coordinate system RC.

The reason why the manipulator M can be made compact is that the second arm L2 is so shaped and sized as not to interfere with the ceiling plate of the chassis BS or the first arm L1 when the joint J2 is caused to pivot.

In the case where the manipulator M is made compact in this example, the first arm L1 is longer than the second arm L2 in the direction along the first pivotal axis AX1. Further, in this case, the second arm L2 is longer than the third arm L3 in the direction described above. Moreover, in this case, the fourth arm L4 is longer than the fifth arm L5 in the direction described above. Further, in this case, the fifth arm L5 is longer than the sixth arm L6 in the direction described above. The first arm L1 to the sixth arm L6 may each instead have any other length.

Figure 5:
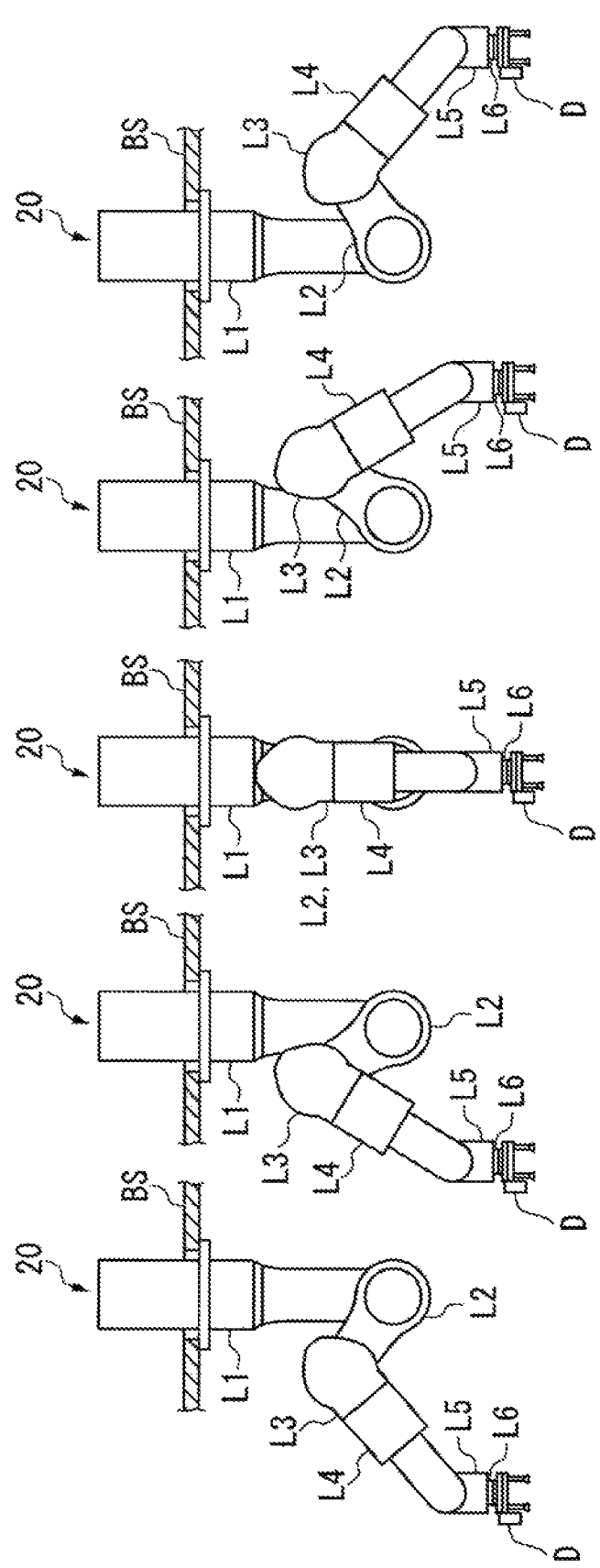
FIG. 5 describes an action of a manipulator or the action via a compact state.

Since the manipulator M can be made compact, the manipulator M can cause the joint J1 not to pivot but the joint J2 to pivot to move the position of the joint J6 via the compact state to the position rotated by 180° around the first pivotal axis AX1, as shown in FIG. 5. FIG. 5 describes an action of the manipulator M or the action via the compact state. The position of the joint J6 is expressed in this example in the form of the position of the center of gravity of the joint J6. The position of the joint J6 is not necessarily expressed in the form of the position of the center of gravity of the joint J6 and may instead be expressed in the form of another position related to the joint J6. More specifically, the manipulator M can cause the joint J1 not to pivot but the joint J2 to move the sixth arm L6, which is the front end of the manipulator M, from the left position shown in the left portion of FIG. 5 via the compact state to the right position shown in the right portion of FIG. 5, which is the position rotated by 180° around the first pivotal axis AX1. In the action shown in FIG. 5, the sixth arm L6 linearly moves when the robot 20 is viewed in the direction along the first pivotal axis AX1.

The sum of the lengths of the third arm L3 to the sixth arm L6 is greater than the length of the second arm L2. Therefore, when the robot 20 is viewed in the direction along the second pivotal axis AX2, and the manipulator M is made compact, the front end of the sixth arm L6 is allowed to protrude beyond the second arm L2. As a result, in the case where the end effector E is attached to the sixth arm L6, a situation in which the end effector E interferes with the first arm L1 and the second arm L2 can be avoided.

As described above, the manipulator M can move the end effector E to the position rotated by 180° around the first pivotal axis AX1 via the compact state by making pivotal motion not around the first pivotal axis AX1 but around the second pivotal axis AX2. As a result, the robot 20 can efficiently move the end effector E, and the space provided to cause no interference of part of the robot 20 with any other object can be reduced.

The description with reference to FIG. 2 is resumed. Actuators provided in the joints J1 to J6 of the manipulator M are communicably connected to the robot controller 30 via cables. The actuators cause the manipulator M to act based on control signals acquired from the robot controller 30. The wired communication via the cables is performed in compliance, for example, with Ethernet (registered trademark), USB, or any other standard. Part or entirety of the actuators may be connected to the robot controller 30 over wireless communication performed in compliance with Wi-Fi (registered trademark) or any other communication standard.

The end effector E is an end effector including a sucker capable of air sucking (holding) of an object. The end effector E is not necessarily the end effector including the sucker and may instead be another end effector, such as an end effector including claws (fingers) capable of pinching an object.

The end effector E is communicably connected to the robot controller 30 via a cable. The thus configured end effector E performs an action based on a control signal acquired from the robot controller 30. The wired communication via the cable is performed in compliance, for example, with Ethernet (registered trademark), USB, or any other standard. The end effector E may be connected to the robot controller 30 over wireless communication performed in compliance with Wi-Fi (registered trademark) or any other communication standard.

The force detector 21 is provided between the end effector E and the manipulator M. The force detector 21 is, for example, a force sensor. The force detector 21 detects external force acting on the end effector E or an object sucked by the end effector E. The external force includes translational force that translates the end effector E or an object sucked by the end effector E and angular moment (torque) that rotates the end effector E or an object sucked by the end effector E. The force detector 21 outputs force detection information containing, as an output value, a value representing the magnitude of the detected external force to the robot controller 30 over the communication.

The force detection information is used to perform force control that is control based on the force detection information out of a variety of types of control performed by the robot controller 30 on the robot 20. The force control is control that causes at least one of the end effector E and the manipulator M to act in such a way that a state in which the external force represented by the force detection information satisfies a predetermined end condition is achieved. The end condition is a condition under which the robot controller 30 terminates the action of the robot 20 based on the force control. That is, the force control is, for example, compliant motion control, such as impedance control. The force detector 21 may instead be another sensor that detects a value representing the magnitude of force or moment acting on the end effector E or an object sucked by the end effector E, such as a torque sensor. The force detector 21 is not necessarily provided between the end effector E and the manipulator M and may instead be provided in another portion of the manipulator M.

The force detector 21 is communicably connected to the robot controller 30 via a cable. The wired communication via the cable is performed in compliance, for example, with Ethernet (registered trademark), USB, or any other standard. The force detector 21 may be connected to the robot controller 30 over wireless communication performed in compliance with Wi-Fi (registered trademark) or any other communication standard.

Providing the robot 20 with the force detector 21 allows, when the user stores an action of the robot 20 in the robot controller 30 (teaches robot controller 30 action of robot 20), the robot controller 30 to store the action through direct teaching. Providing the robot 20 with the force detector 21 further allows the robot controller 30 to cause the robot 20, for example, to hold an object without deformation thereof due to the force control.

The discharger D is a dispenser capable of discharging a discharge object. Specifically, the discharger D is a noncontact dispenser capable of discharging a discharge object toward the target object O without contact between the discharger D and the target object. The discharge object is a dischargeable substance, such as liquid, gas, and powder. The following description will be made with reference to a case where the discharge object is grease (lubricant). The discharger D includes a discharge port that is not shown, a syringe that is not shown, and an air injector that is not shown but injects air into the syringe. The discharge port is a hole through which the grease contained in the syringe is discharged. The syringe is a container having a space that accommodates the grease. That is, the discharger D is so configured that the air injector injects air into the syringe and the pressure of the air discharges the grease contained in the syringe through the discharge port. In this example, the discharger D is provided as part of the end effector E. The position where the discharger D can discharge the discharge object therefore changes in accordance with the movement of the movable section A.

Figure 6:
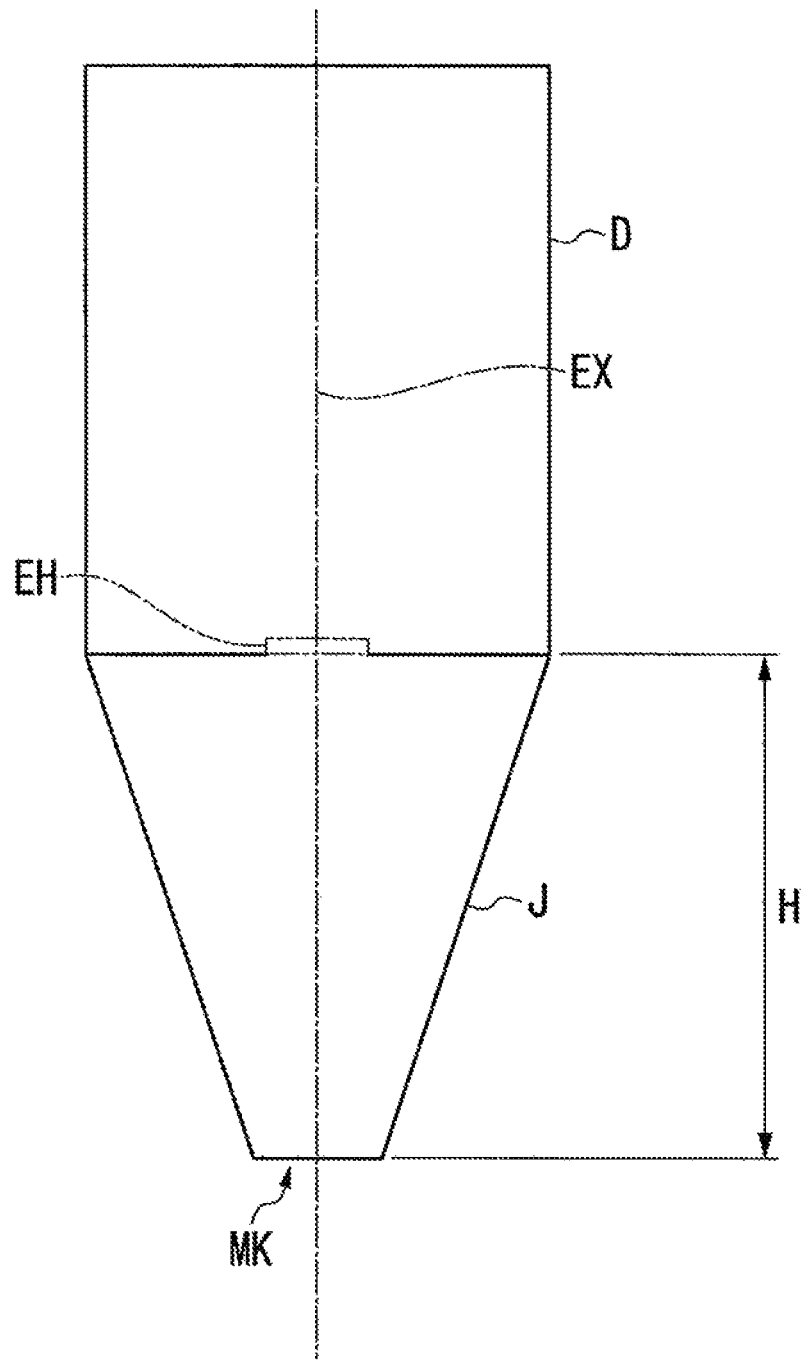
FIG. 6 shows an example of a discharger to which a jig is attached.

The discharger D has a box-like shape in this example. The discharger D does not necessarily have a box-like shape and may instead have a circularly columnar shape or any other shape. The discharge port described above is formed in one of the six surfaces of the discharger D having a box-like shape. A removably attachable jig J can be attached, with bolts or any other fastening members, to a discharge surface that is the surface where the discharge port is formed out of the six surfaces of the discharger D. FIG. 6 shows an example of the discharger D attached to the jig J. FIG. 6 is a side view of the discharger D and the jig J when the discharger D is viewed in the direction toward any of the four surfaces perpendicular to the discharge surface, out of the six surfaces of the discharger D, which has a box-like shape.

A discharge port EH shown in FIG. 6 is an example of the discharge port described above. The discharger D discharges the discharge object through the discharge port EH. In this process, the discharger D discharges the discharge object from the interior of the discharger D through the discharge port EH in one of the directions perpendicular to the discharge surface or the direction outward out of the discharger D. The straight line EX shown in FIG. 6 represents the axis passing through the center of the discharge port EH and extending along the discharge direction. That is, the discharger D discharges the discharge object along the straight line EX. That is, in a case where the surface of the target object intersects the straight line EX, the discharge object is applied onto the intersection of the surface and the straight line EX. In the following description, the position of the intersection in the robot coordinate system RC is called a position of landing for ease of description.

The jig J is provided with a marker MK. The jig J may have any shape that allows, in the state in which the jig J is attached to the discharger D, the marker MK to be located in a position farthest from the discharge surface of the discharger D and located along the discharge direction and the marker MK to further be located on the straight line EX. In the example shown in FIG. 6, the jig J has a truncated conical shape. That is, the front end of the jig J, which has a truncated conical shape, that is, the center of the upper surface of the truncated conical shape is located on the straight line EX. Further, the marker MK is provided on the upper surface. The marker MK is a mark indicating the position of the center of the upper surface. In this example, the distance in the discharge direction from the discharge surface to the upper surface is a distance H. That is, the marker MK is a mark indicating the position of landing in the case where the distance in the discharge direction from the discharge surface to the surface of the target object is the distance H. The marker MK may have any shape capable of indicating the position of landing. Since the marker MK provided on the jig J indicates the position of landing, it is desirable that, in the case where the jig J has a truncated conical shape, the area of the front end of the jig J, which has a truncated conical shape, that is, the area of the upper surface of the truncated conical shape is roughly an area over which the discharge object covers a surface around a point on the target object when the discharger D applies the discharge object onto the position. In the following description, the distance H is called the length of the jig J for ease of description.

The jig J is so attached that the discharge surface is immobile. That is, the jig J is so attached to the discharger D that the relative positional relationship between the position of the discharger D and the position indicated by the marker MK does not change. The length of the jig J (distance H in example shown in FIG. 6) may or may not be variable. In the case where the length of the jig J is variable, the jig J includes a mechanism capable of changing the length.

The discharger D shown in FIGS. 1 and 2 is an example of the discharger D to which the jig J is attached. The discharger D shown in FIGS. 3 to 5 is an example of the discharger D to which the jig J is not attached.

The description with reference to FIGS. 1 and 2 is resumed. The robot controller 30 is a controller that controls the robot 20. The robot controller 30 causes the robot 20 to act based on an action program stored in advance by the user. The thus configured robot controller 30 allows the robot 20 to perform predetermined work. The predetermined work is, for example, work of applying the discharge object onto a predetermined position on the target object O. The predetermined work may be another work in place of the work described above.

The robot controller 30 is provided (built) in the base B in this example. The robot controller 30 may instead be a component separate from the robot 20. In this case, the robot system 1 includes at least the robot 20 and the robot controller 30 that is a component separate from the robot 20.

Overview of Process Carried Out by Robot Controller when Robot is Caused to Act

An overview of a process carried out by the robot controller 30 when the robot 20 is caused to act will be described below.

The robot controller 30 sets a control point T, which is a TCP (tool center point) that moves along with the end effector E, in a predetermined position on the end effector E. The predetermined position on the end effector E is the position of the center of gravity of the end effector E. The predetermined position on the end effector E may instead be another position related to the end effector E. The robot controller 30 does not necessarily set the control point T in the predetermined position on the end effector E and may set the control point T in another position related to the movable section A.

Control point position information that is information representing the position of the control point T and control point attitude information that is information representing the attitude of the control point T are related to the control point T. In addition to the two pieces of information, another piece of information may be related to the control point T. The robot controller 30 specifies (determines) the control point position information and the control point attitude information. The robot controller 30 causes at least one of the joints J1 to J6 to act to cause the position of the control point T to coincide with the position indicated by the specified control point position information and cause the attitude of the control point T to coincide with the attitude indicated by the specified control point attitude information. That is, the robot controller 30 specifies the control point position information and the control point attitude information to cause the robot 20 to act.

In this example, since the robot 20 includes the six-axis vertical multiple-joint movable section A, the position of the control point T is roughly determined by causing each of the joints J1 to J3 to pivot. Fine adjustment of the position of the control point T can also be performed by causing each of the joints J4 to J6 to pivot. In this example, the attitude of the control point T is determined by causing each of the joints J4 to J6 to pivot.

In this example, the position of the control point T is expressed in the form of the position of the origin of a control point coordinate system TC in the robot coordinate system RC. The attitude of the control point T is expressed in the form of the direction of each of the coordinate axes of the control point coordinate system TC in the robot coordinate system RC. The control point coordinate system TC is a three-dimensional orthogonal coordinate system so related to the control point T as to move along with the control point T. In this example, the position and attitude of the movable section A are expressed in the form of the position and attitude of the control point T.

To cause the robot controller 30 to store (be taught) the position of the discharger D in the case where the discharger D, which is a noncontact discharger, applies the discharge object onto a predetermined position on the target object O, it is necessary to evaluate whether or not the position of the discharger D coincides with a position that allows the discharger D to discharge the discharge object to a desired position where the user desires to apply the discharge object. It is, however, difficult in some cases to precisely evaluate whether or not the position of the discharger D coincides with the dischargeable position in a robot system X1 (robot system of related art, for example) different from the robot system 1. The robot controller 30 therefore cannot cause the robot 20 to precisely perform the work of applying the discharge object onto the predetermined position on the target object O.

To solve the problem described above, the robot controller 30 in this example uses a first position based on the jig J removably attached to the discharger D to generate teaching information on the position of the movable section A. The robot controller 30 then allows the robot 20 to precisely perform the work of applying the discharge object onto the predetermined position on the target object O.

A detailed description will be made of specific examples of the first position and the teaching information and the process in which the robot controller 30 generates the teaching information by using the first position.

Hardware Configuration of Robot Controller

Figure 7:
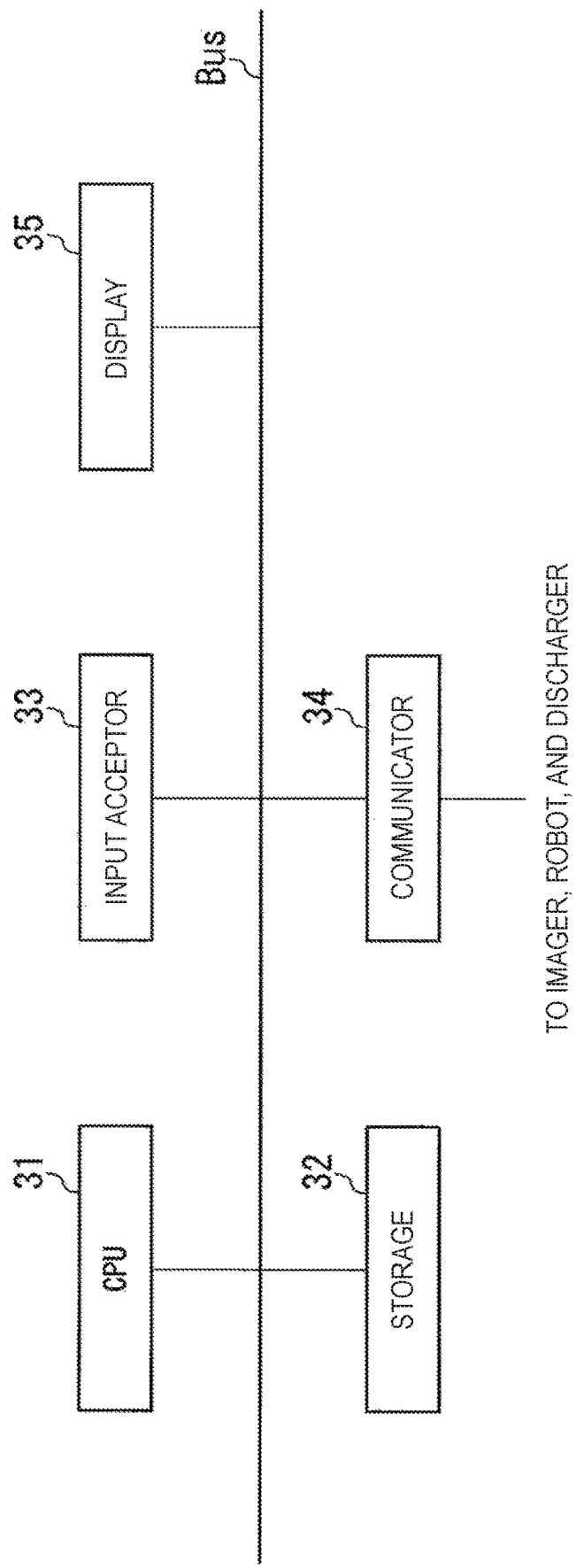
FIG. 7 shows an example of the hardware configuration of a robot controller.

The hardware configuration of the robot controller 30 will be described below with reference to FIG. 7. FIG. 7 shows an example of the hardware configuration of the robot controller 30.

The robot controller 30 includes, for example, a CPU (central processing unit) 31, a storage 32, an input acceptor 33, a communicator 34, and a display 35. The components described above are communicably connected to each other via a bus Bus. The robot controller 30 communicates with the imager 10, the robot 20, and the discharger D via the communicator 34.

The CPU 31 executes a variety of programs stored in the storage 32.

The storage 32 includes, for example, an HDD (hard disk drive), an SSD (solid state drive), an EEPROM (electrically erasable programmable read-only memory), a ROM (read-only memory), and a RAM (random access memory). The storage 32 may not necessarily be built in the robot controller 30 and may be an external storage device connected via a USB port or any other digital input/output port. The storage 32 stores, for example, a variety of pieces of information processed by the robot controller 30 (including teaching point information), a variety of programs (including action program), and a variety of images.

The input acceptor 33 is, for example, a keyboard and a mouse, a touch pad, or any other input device. The input acceptor 33 may instead be a touch panel integrated with the display 35. The input acceptor 33 may be a component separate from the robot controller 30. In this case, the input acceptor 33 is communicably connected to the robot controller 30 via a wire or wirelessly.

The communicator 34 is formed, for example, of a USB port or any other digital input/output port or an Ethernet (registered trademark) port.

The display 35 is, for example, a liquid crystal display or an organic EL (electroluminescence) display panel. The display 35 may be a component separate from the robot controller 30. In this case, the display 35 is communicably connected to the robot controller 30 via a wire or wirelessly.

Functional Configuration of Robot Controller

Figure 8:
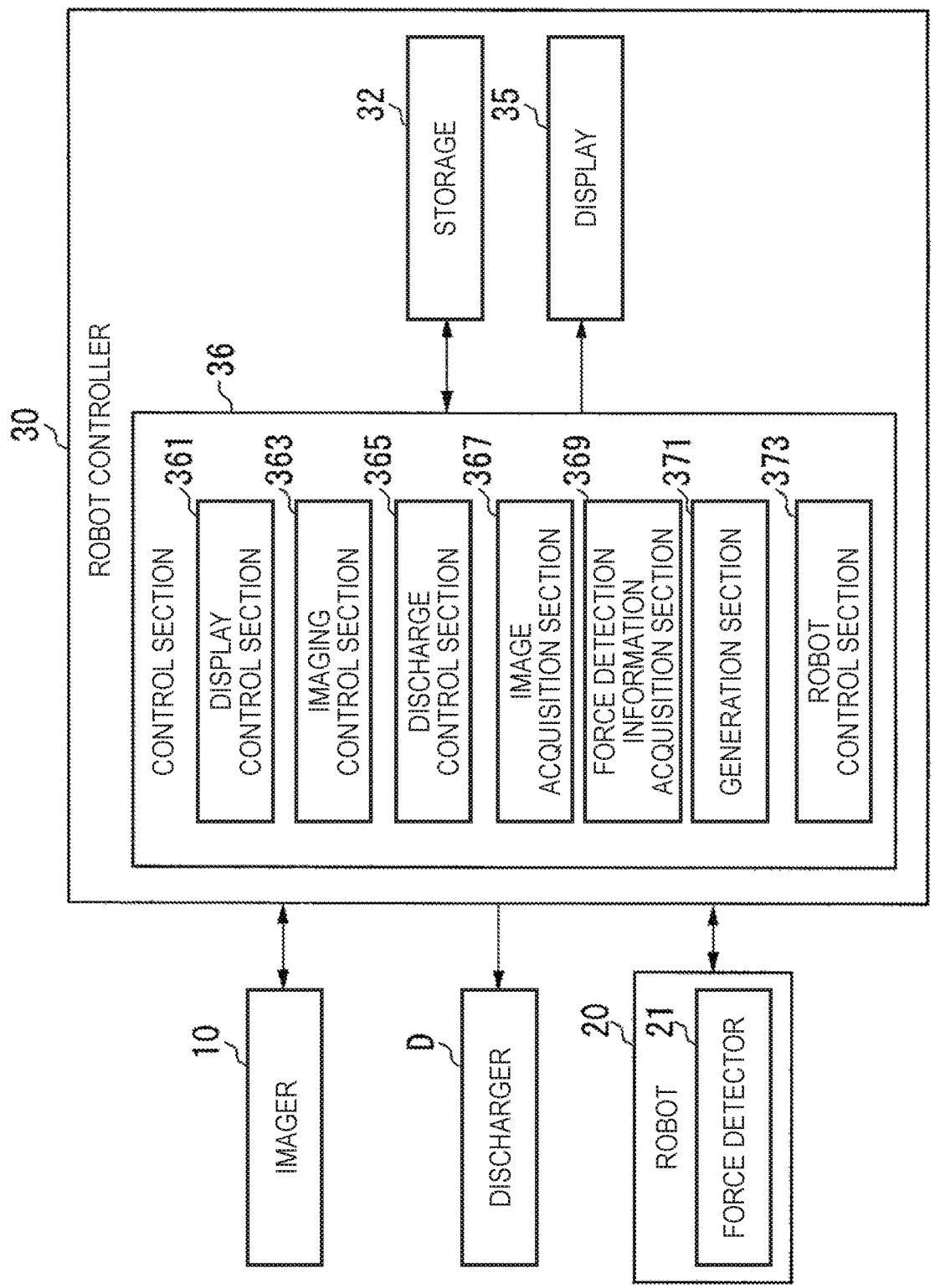
FIG. 8 shows an example of the functional configuration of the robot controller.

The functional configuration of the robot controller 30 will be described below with reference to FIG. 8. FIG. 8 shows an example of the functional configuration of the robot controller 30.

The robot controller 30 includes the storage 32, the display 35, and a control section 36.

The control section 36 controls the entire robot controller 30. The control section 36 includes a display control section 361, an imaging control section 363, a discharge control section 365, an image acquisition section 367, a force detection information acquisition section 369, a generation section 371, and a robot control section 373. These functional sections provided in the control section 36 are achieved, for example, when the CPU 31 executes the variety of programs stored in the storage 32. Part or entirety of the functional sections may be an LSI (large scale integration) circuit, an ASIC (application specific integrated circuit), or any other hardware functional section.

The display control section 361 generates a variety of screens (images) that the robot controller 30 causes the display 35 to display. The display control section 361 causes the display 35 to display a screen generated by the display control section 361.

The imaging control section 363 causes the imager 10 to perform imaging over the range over which the imager 10 can perform imaging.

The discharge control section 365 causes the discharger D to discharge a discharge object to a position where the discharger D can discharge the discharge object.

The image acquisition section 367 acquires the image captured by the imager 10 from the imager 10.

The force detection information acquisition section 369 acquires the force detection information containing, as an output value, a value representing the magnitude of external force detected by the force detector 21 from the force detector 21.

The generation section 371 generates the teaching information described above.

The robot control section 373 controls the robot (causes robot 20 to act).

Process in Which Robot Controller Uses First Position to Generate Teaching Information A description will be made of specific examples of the first position and the teaching information and the process in which the robot controller 30 generates the teaching information by using the first position.

The teaching information is information on the position of the movable section A, as described above. Further, the teaching information is not only information stored in (taught to) the robot controller 30 but information used by the robot controller 30 to control the robot 20 (cause robot 20 to act).

Process of Generating First Teaching Information, Which is First Specific Example of Teaching Information A description will be made of first teaching information, which is a first specific example of the teaching information on the position of the movable section A described above, and a first process, which is the process in which the robot controller 30 generates the first teaching information.

The first teaching information is information representing the relative positional relationship between the position of the discharger D and the position of the movable section A. The robot controller 30 generates the first teaching information and causes the storage 32 to store the generated first teaching information to move the movable section A, whereby the position of the discharger D can be precisely moved to a user's desired position.

In the case where the robot controller 30 generates the first teaching information, the first position based on the jig J removably attached to the discharger D is the position indicated by the marker MK provided on the jig J. In the following description, the position indicated by the marker MK is called the position of the marker MK. That is, the robot controller 30 uses the position of the marker MK provided on the jig J removably attached to the discharger D to generate the first teaching information.

Figure 9:
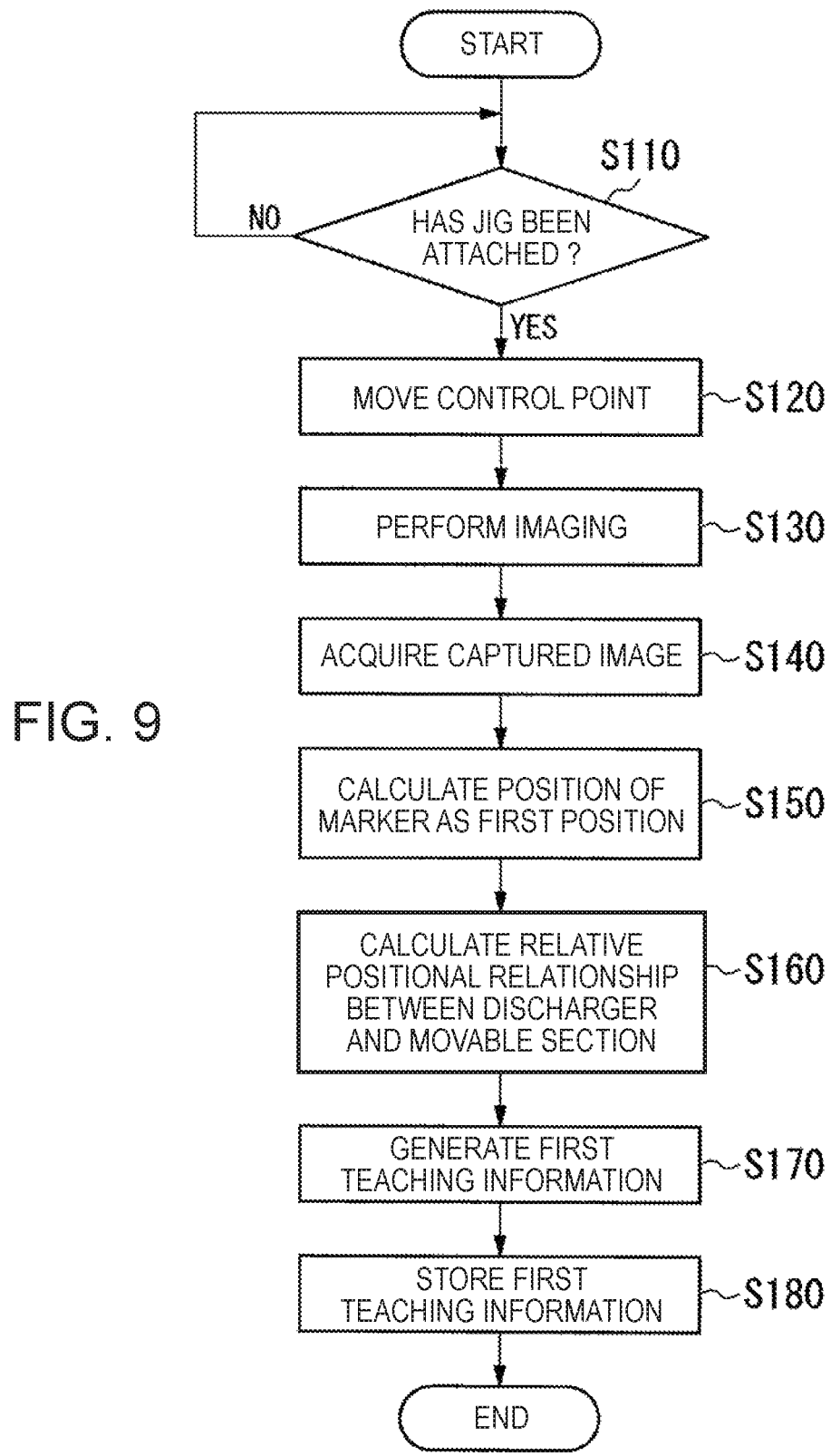
FIG. 9 is a flowchart showing an example of the procedure of a first process carried out by the robot controller.

The first process, which is the process in which the robot controller 30 generates the first teaching information, will be described with reference to FIG. 9. FIG. 9 is a flowchart showing an example of the procedure of the first process carried out by the robot controller 30. The flowchart shown in FIG. 9 will be described with reference to a case where the robot controller 30 accepts in advance the user's operation of starting the first process before the process in step S110 is carried out. The robot controller 30 accepts the user's operation of starting the first process via an operation screen which the display acquisition section 361 causes the display 35 to display and through which the robot controller 30 accepts the user's operation. The robot controller 30 may instead accept the user's operation of starting the first process by using another method.

The robot control section 373 waits until the jig J is attached to the discharger D (step S110). The robot controller 30, when it accepts information representing that the jig J has been attached to the discharger D from the user, for example, via the operation screen described above, determines that the jig J has been attached to the discharger D. In the case where the result of the evaluation shows that the jig J has been attached to the discharger D (YES in step S110), the robot control section 373 moves the control point T in such a way that the position of the movable section A coincides with a predetermined imaging position and the attitude of the movable section A coincides with a predetermined imaging attitude (step S120). The imaging position may be, in the case where the position of the movable section A coincides therewith, any position where the discharger D falls within the imaging range over which the imager 10 can perform imaging. The imaging attitude is, in the state in which the position of the movable section A coincides with the imaging position, an attitude of the movable section A or the attitude that causes the direction along the optical axis of the imager 10 to be parallel to the discharge direction and allows the imager 10 to capture an image of the marker MK. In this example, the imaging attitude is the attitude of the movable section A that causes the discharge direction of the discharger D to coincide with the downward direction.

The imaging control section 363 then causes the imager 10 to performs imaging over the range over which the imager 10 can perform imaging (step S130). The image acquisition section 367 then acquires the image captured by the imager 10 in step S130 from the imager 10 (step S140). The generation section 371 then calculates the position of the marker MK in the robot coordinate system RC as the first position described above based on the captured image acquired by the image acquisition section 367 in step S140 (step S150). The generating section 371 has performed in advance calibration that relates the position on the captured image to the position in the robot coordinate system RC. The method that allows the generation section 371 to calculate the position of the maker MK based on the captured image may instead, for example, be a known method, such as pattern matching, or a method to be developed in the future.

The generation section 371 then reads first correspondence information stored in the storage 32 in advance from the storage 32. The first correspondence information is information representing the relative positional relationship between the position of the discharger D and the position of the marker MK in the case where the jig J is attached to the discharger D. The generation section 371 uses the read first correspondence information and the position of the marker MK calculated as the first position in step S150 to calculate the relative positional relationship between the position of the discharger D and the position of the movable section A in the robot coordinate system RC (step S160).

The generation section 371 then generates information representing the positional relationship calculated in step S160 as the first teaching information (step S170). The generation section 371 then causes the storage 32 to store the first teaching information generated in step S170 (step S180) and terminates the process.

As described above, the robot controller 30 carries out the first process, that is, the processes shown in FIG. 9, to generate the first teaching information by using the first position based on the jig J (position of marker MK in this example). Based on the first teaching information, the robot controller 30 can precisely move the position of the discharger D to the user's desired position by moving the movable section A. As a result, the robot controller 30 can cause the robot 20 to precisely perform the work of applying the discharge object onto a predetermined position on the target object O.

After the process in step S120 is carried out but before the process in step S130 is carried out, a transparent glass plate may be so disposed between the discharger D and the imager 10 as to be perpendicular to the discharge direction. In this case, between the discharger D and the imager 10, the robot controller 30, for example, causes the front end of the jig J to come into contact with the glass plate under the force control. The user removes the jig J from the discharger D in the state in which the front end of the jig J is in contact with the glass plate. The robot controller 30 then causes the discharger D to discharge the discharge object toward the glass plate. The robot controller 30 then causes the imager 10 to perform imaging over the range over which the imager 10 can perform imaging in step S130. The image captured by the imager 10 contains the position of impact where the discharge object applied onto the glass plate has landed. The robot controller 30 acquires the captured image in step S140. The robot controller 30 calculates the position of landing as the first position based on the acquired captured image in step S150. The robot controller 30 can similarly generate the first teaching information by using the glass plate as described above.

Process of Generating Second Teaching Information, Which is Second Specific Example of Teaching Information A description will be made of second teaching information, which is a second specific example of the teaching information on the position of the movable section A, and a second process, which is the process in which the robot controller 30 generates the second teaching information.

The second teaching information is teaching point information representing at least one teaching point. A teaching point is an imaginary point that is a target to which the control point T is moved when the robot controller causes the movable section A to act. Teaching point position information, teaching point attitude information, and teaching point identification information are related to the teaching point. The teaching point position information is information representing the position of the teaching point. The teaching point attitude information is information representing the attitude of the teaching point. In this example, the position of a teaching point is expressed in the form of the position of the origin of a teaching point coordinate system, which is a three-dimensional orthogonal coordinate system related to the teaching point, in the robot coordinate system RC. The attitude of a teaching point is expressed in the form of the direction of each coordinate axis of the teaching point coordinate system in the robot coordinate system RC. The teaching point identification information is information that identifies a teaching point and is, for example, an ID that identifies a teaching point. In addition to the teaching point position information, the teaching point attitude information, and the teaching point identification information, another piece of information may be related to a teaching point.

In a case where the robot controller 30 controls the robot 20 (causes robot to act) based on the second teaching information, the robot controller 30 sequentially specifies one or more teaching points indicated by the second teaching information (that is, teaching point information) based, for example, on the action program inputted by the user in advance and the teaching point identification information. The robot controller 30 specifies the teaching point position information representing the position of each of the specified teaching points as the control point position information and further specifies the teaching point attitude information representing the attitude of the teaching point as the control point attitude information. The robot controller then causes the position of the control point T to coincide with the position indicated by the specified control point position information and causes the attitude of the control point T to coincide with the attitude indicated by the specified control point attitude information by moving the movable section A.

That is, the robot controller 30 causes the position and attitude of the control point T to coincide with the position and attitude of the teaching point (causes control point T to coincide with teaching point). The robot controller 30 can therefore cause the movable section A to perform a desired action. As a result, the robot controller 30 allows the robot 20 to perform predetermined work.

To change the position and attitude of the control point T, the robot controller 30 generates control signals containing signals that control the actuators of the manipulator M based on the action program stored in advance based on operation accepted from the user and the second teaching information (that is, teaching point information). The control signals further contains another signal, such as a signal that moves the end effector E. The robot controller 30 then transmits the generated control signals to the robot 20 to cause the robot 20 to perform predetermined work.

As described above, the robot controller 30 controls the robot 20 (causes robot 20 to act) based on the second teaching information. The user can teach the robot controller 30 the second teaching information (causes robot controller 30 to store second teaching information) through direct teaching, online teaching, or any other type of teaching. That is, the robot controller 30 has, as action modes in which the user causes the robot controller 30 to store the second teaching information (teaches robot controller 30 second teaching information), a first teaching mode in which the user causes the robot controller 30 to store the second teaching information (teaches robot controller 30 second teaching information) through direct teaching and a second teaching mode in which the user causes the robot controller 30 to store the second teaching information (teaches robot controller 30 second teaching information) through online teaching. The second process carried out by the robot controller 30 in the first teaching mode will be described below by way of example. The direct teaching is work of allowing the user to apply external force to the movable section A to change the position and attitude of the movable section A to desired position and attitude and then causing the robot controller 30 to store (teaching robot controller 30), as the second teaching information, teaching point information representing a teaching point to which the teaching point position information representing the position of the movable section A after the change of the position and the teaching point attitude information representing the attitude of the movable section A after the change of the attitude are related. The online teaching is work of allowing the user to operate the robot controller 30 in such a way that the position and attitude of the movable section A are changed to change the position and attitude of the movable section A to desired position and attitude and then causing the robot controller 30 to store (teaching robot controller 30), as the second teaching information, teaching point information representing a teaching point to which the teaching point position information representing the position of the movable section A after the change of the position and the teaching point attitude information representing the attitude of the movable section A after the change of the attitude are related.

Figure 10:
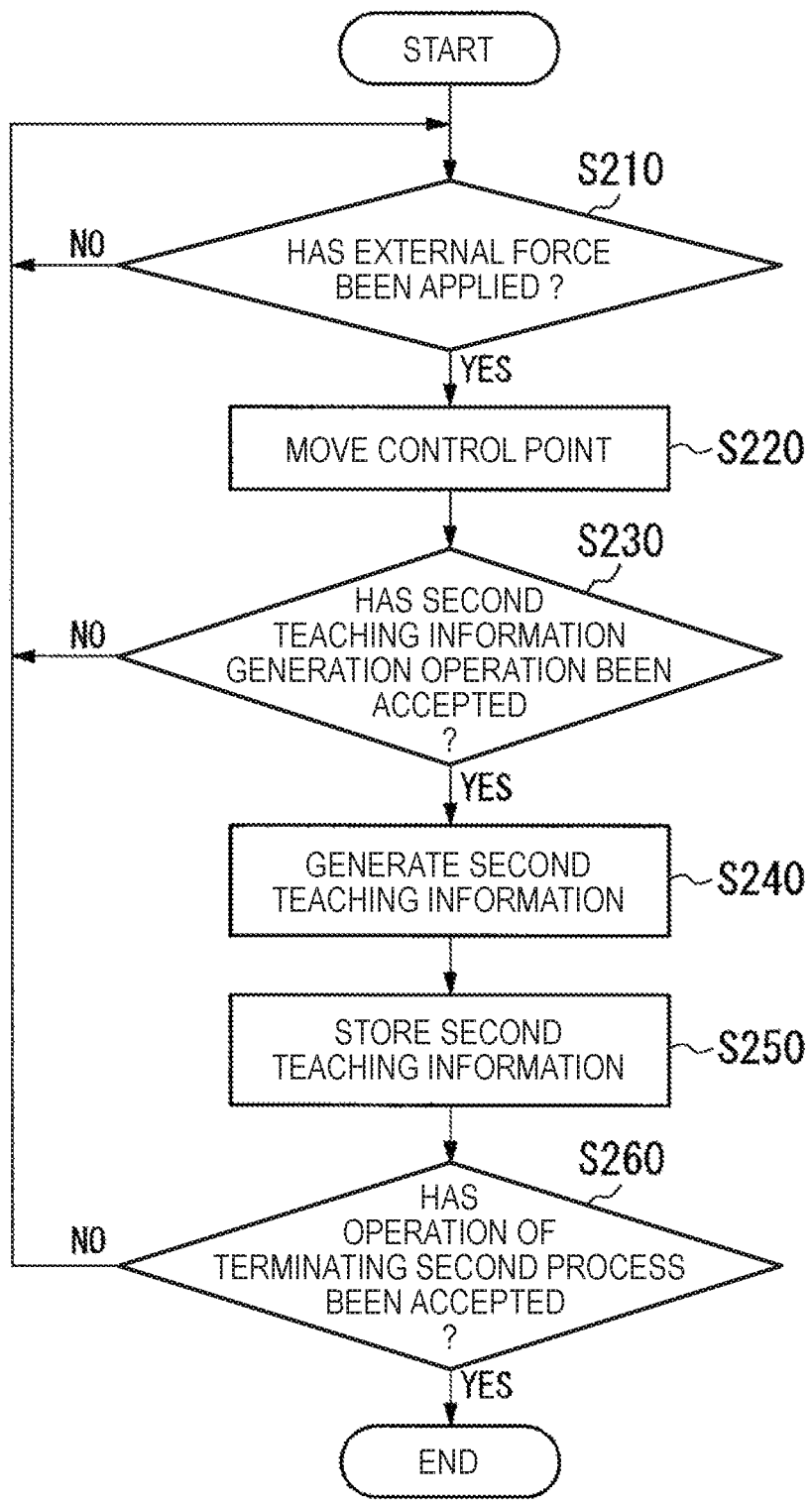
FIG. 10 is a flowchart showing an example of the procedure of a second process carried out by the robot controller in a first teaching mode.

The second process in which the robot controller 30 generates the second teaching information in the first teaching mode will be described with reference to FIG. 10. FIG. 10 is a flowchart showing an example of the procedure of the second process carried out by the robot controller 30 in the first teaching mode. The flowchart shown in FIG. 10 will be described with reference to a case where the robot controller 30 accepts in advance the user's operation of setting the action mode of the robot controller 30 to be the first teaching mode before the procedure carried out in step S210. The flowchart will also be described with reference to a case where the robot controller 30 accepts in advance the user's operation of causing the robot controller 30 to start the second process before the second process is carried out. The robot controller 30 accepts the user's operation of setting the action mode to be the first teaching mode and the user's operation of starting the second process, for example, via the operation screen described above. The robot controller 30 may instead accept the operation of setting the action mode to be the first teaching mode by using another method and may instead accept the user's operation of starting the second process by using another method.

The robot control section 373 waits until external force is applied to the movable section A (step S210). Specifically, the robot control section 373 causes the force detection information acquisition section 369 to acquire the force detection information from the force detector 21. The robot control section 373 then evaluates whether or not external force has been applied to the movable section A based on the output value contained in the force detection information acquired by the force detection information acquisition section 369. In a case where the result of the evaluation shows that external force has been applied to the movable section A (YES in step S210), the robot control section 373 moves the control point T under the force control based on the external force applied to the movable section A to change the position and attitude of the movable section A (step S220). In this example, the force control is impedance control, as described above.

The generation section 371 then evaluates whether or not second teaching information generation operation that is operation of causing the robot controller 30 to generate the second teaching information has been accepted from the user (step S230). The generation section 371 accepts the second teaching information generation operation from the user, for example, via the operation screen described above. The generation section 371 may instead accept the second teaching information generation operation from the user by using another method. In a case where the generation section 371 determines that the second teaching information generation operation has not been accepted from the user (NO in step S230), the robot control section 373 transitions to step S210 and waits again until external force is applied to the movable section A. On the other hand, in a case where the result of the generation section 371 determines that the second teaching information generation operation has been accepted from the user (YES in step S230), the generation section 371 generates, as the second teaching information, teaching point information representing a teaching point to which the teaching point position information representing the current position of the movable section A and the teaching point attitude information representing the current attitude of the movable section A are related (step S240). In this process, the generation section 371 generates, as the second teaching information, teaching point information representing the teaching point to which the teaching point identification information that identifies the teaching point as well as the teaching point position information and the teaching point attitude information are related. The generation section 371 then causes the storage 32 to store the second teaching information generated in step S240 (step S250).

The robot control section 373 then evaluates whether or not the user's operation of terminating the second process has been accepted (step S260). The robot control section 373 accepts the operation from the user, for example, via the operation screen described above. The robot control section 373 may instead accept the operation from the user by using any other method. In a case where the result of the evaluation shows that the operation has not been accepted from the user (No in step S260), the robot control section 373 transitions to step S210 and waits again until external force is applied to the movable section A. On the other hand, in a case where the result of the evaluation shows that the operation has been accepted from the user (YES in step S260), the robot control section 373 terminates the second process.

In the processes in steps S210 to S220, in the case where the jig J has been attached to the discharger D, the user can cause the robot controller 30 to store, as the second teaching information, information representing the position and attitude of the movable section A in the state in which the movable section A is moved by applying external force to the movable section A under the force control performed by the robot controller 30 to cause the front end of the jig J to come into contact with a predetermined position on the target object O, that is, a desired position where the user desires to apply the discharge object (that is, teaching point information described above). That is, the position of the front end of the jig J (that is, position of marker MK) in the state in which the front end is in contact with the target object O is the desired position where the user desires to apply the discharge object and the example of the first position in this example. Further, the user can cause the position and attitude of the discharger D to coincide with the user's desired position and attitude with the front end of the jig J being in contact with the desired position where the user desires to apply the discharge object (that is, with position and attitude of the discharger D caused to coincide with position and attitude that allow discharge object to be discharged to desired position). As a result, the user can readily cause the robot controller 30 to store, as the second teaching information, information representing the user's desired position and attitude of the discharger D that allow the discharger D to discharge the discharge object to the desired position where the user desires to apply the discharge object (that is, teaching point information described above).

As described above, by carrying out the second process, that is, the processes in the flowchart shown in FIG. 10, the robot controller 30 can generate the second teaching information by using the first position based on the jig J (the position of the front end of jig J in the state in which the front end is in contact with the target object O). The robot controller 30 can therefore precisely move the position of the discharger D by moving the movable section A to the user's desired position. As a result, the robot controller 30 can cause the robot 20 to precisely perform the work of applying the discharge object onto the predetermined position on the target object O.

Process of Generating Third Teaching Information, Which is Third Specific Example of Teaching Information A description will be made of third teaching information, which is a third specific example of the teaching information on the position of the movable section A, and a third process, which is the process in which the robot controller 30 generates the third teaching information.

The third teaching information is information according to a shape based on at least three positions where the front end of the jig J attached to the discharger D is caused to come into contact with the upper surface of the target object O placed on the work bench TB described above. The at least three positions are each an example of the first position. The following description will be made, by way of example, of a case where the robot controller 30 generates, as the third teaching information, information according to a flat plane based on the at least three positions as the shape based on the at least three positions. That is, the robot controller 30 generates, as the third teaching information, information according to a flat plane based on the at least three positions, that is, a flat plane containing the upper surface of the target object O as a partial flat plane. The shape based on the at least three positions is not necessarily a flat plane and may instead be a curved plane, a spherical plane, or any other shape.

The information according to the flat plane based on the at least three positions where the front end of the jig J attached to the discharger D is caused to come into contact with the upper surface of the target object O placed on the work bench TB is, for example, information representing a flat plane coordinate system FC, which is a three-dimensional orthogonal coordinate system expressing the position on the flat surface. The X and Y axes of the flat plane coordinate system FC are perpendicular to each other and parallel to the flat plane, that is, the upper surface of the target object O. The Z axis of the flat plane coordinate system FC is perpendicular to the X and Y axes and perpendicular to the flat surface, that is, the upper surface of the target object O. The flat plane defined by a set of positions each having a Z coordinate, which is the coordinate on the Z axis, of zero out of the positions in the flat plane coordinate system FC is the flat plane containing the upper surface of the target object O as a partial flat plane.

In a case where the inclination of an XY plane with respect to the upper surface of the target object O changes whenever the target object O is placed on the upper surface of the work bench TB, it is difficult for a robot controller X2 (robot controller of related art, for example) different from the robot controller 30 to move the position of the movable section A along the upper surface of the target object O. The XY plane is a flat plane defined by the X and Y axes of the robot coordinate system RC. To solve the problem described above, the robot controller 30 generates information according to the flat plane containing the upper surface of the target object O as a partial flat plane, that is, information representing the flat plane coordinate system FC and moves the position of the movable section A along the upper surface based on the generated information. The robot controller 30 can therefore precisely move the position of the discharger D to the user's desired position. As a result, the robot controller 30 can cause the robot 20 to precisely perform the work of applying the discharge object onto a predetermined position on the target object O.

Figure 11:
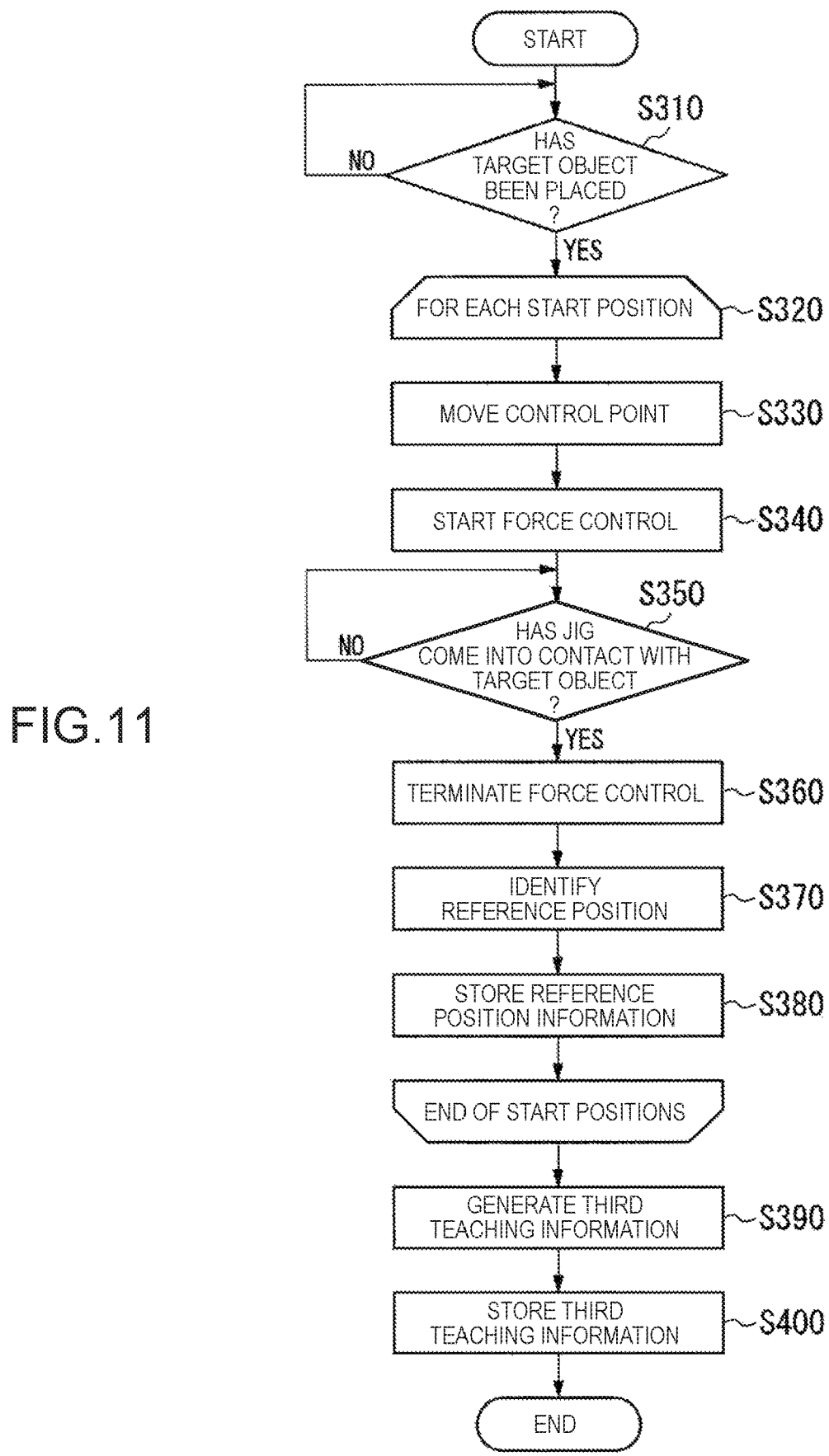
FIG. 11 is a flowchart showing an example of the procedure of a third process carried out by the robot controller.

The third process, which is the process in which the robot controller 30 generates the third teaching information, will be described with reference to FIG. 11. FIG. 11 is a flowchart showing an example of the procedure of the third process carried out by the robot controller 30. The flowchart shown in FIG. 11 will be described with reference to a case where the robot controller 30 accepts in advance the user's operation of starting the third process before the process in step S310 is carried out. The robot controller 30 accepts the user's operation of starting the third process, for example, via the operation screen described above. The robot controller 30 may instead accept the user's operation of starting the third process by using another method.

The robot control section 373 waits until the user places the target object O in a predetermined position on the upper surface of the work bench TB (step S310). The robot control section 373, when it accepts information representing that the target object O has been placed in the position from the user, for example, via the operation screen described above, determines that the user has placed the target object O in the position. The robot control section 373 may instead determine by using another method that the user has placed the target object O in the position. In a case where the result of the evaluation shows that the user has placed the target object O in the position (YES in step S310), the robot control section 373 reads start position information stored in the storage 32 in advance from the storage 32. The start position information is information representing at least three start positions. A start position is a desired position with which the position of the movable section A is desired to coincide when the process in step S340 starts and which is a position in the robot coordinate system RC. In this example, the start positions are each not only a position located above the upper surface of the work bench TB but a position where the jig J attached to the discharger D is not contact with the target object O. The start positions are each a position located inside the contour of the target object O when the upper surface of the target object O is viewed from the positive side of the Z axis toward the negative side thereof in the robot coordinate system RC. The start position information contains order information representing the order related to the at least three start positions. The start positions may instead be other positions. The robot control section 373 selects the at least three start positions one by one as a target start position in descending order of the selection based on the order information contained in the read start position information and repeatedly carries out the processes in steps S330 to S380 whenever the target start position is selected (step S320). The following description will be made of a case where the number of start positions indicated by the start position information is three by way of example. The number may be any number that is greater than or equal to three.

The robot control section 373 moves the control point T in such a way that the position of the movable section A coincides with the target start position selected in step S320 (step S330). In this process, the robot control section 373 causes the attitude of the movable section A to coincide with a predetermined start attitude. The start attitude is a desired attitude with which the attitude of the movable section A is desired to coincide when the process in step S340 starts. In this example, the start attitude is the attitude of the movable section A in a case where the negative-side direction of the Z axis in the robot coordinate system RC coincides with the discharge direction described above. The start attitude may instead be another attitude of the movable section A in a case where the negative-side direction does not coincide with the discharge direction.

The robot control section 373 then starts the force control (impedance control in this example) (step S340). Specifically, the robot control section 373 starts moving the control point T in such a way that the magnitude of external force detected with the force detector 21 and acting toward the positive side of the Z axis in the robot coordinate system RC is greater than or equal to a predetermined threshold. That is, the robot control section 373 starts moving the control point T under the force control toward the negative side of the Z axis. The threshold is, for example, 0.1 N. The threshold is not necessarily 0.1 N and may be smaller than or greater than 0.1 N.

The robot control section 373 then evaluates whether or not the front end of the jig J attached to the discharger D has come into contact with the upper surface of the target object O (step S350). The robot control section 373, when it determines that the magnitude of the external force detected with the force detector 21 and acting toward the positive side of the Z axis in the robot coordinate system RC is greater than or equal to the predetermined threshold, determines that the front end has come into contact with the upper surface. On the other hand, the robot control section 373, when it determines that the magnitude of the external force detected with the force detector 21 and acting toward the positive side of the Z axis in the robot coordinate system RC is smaller than the predetermined threshold, determines that the front end has not come into contact with the upper surface. Specifically, the robot control section 373 causes the force detection information acquisition section 369 to acquire the force detection information from the force detector 21. The robot control section 373, when it determines that the magnitude of the external force indicated by the output value contained in the force detection information acquired by the force detection information acquisition section 369 and acting toward the positive side is smaller than the predetermined threshold (NO in step S350), determines that the front end has not come into contact with the upper surface and keeps carrying out the process in step S330. On the other hand, the robot control section 373, when it determines that the magnitude of the external force indicated by the output value contained in the force detection information acquired by the force detection information acquisition section 369 and acting toward the positive side is greater than or equal to the predetermined threshold (YES in step S350), determines that the front end has come into contact with the upper surface and terminates the force control having started in step S340 to stop moving the control point T (step S360).

The generation section 371 then identifies the current position of the marker MK in the robot coordinate system RC as a reference position (step S370). At this point, the generation section 371 calculates the position of the marker MK in the robot coordinate system RC based on the current position of the movable section A in the robot coordinate system RC, the first correspondence information described above, and the first teaching information described above. The generation section 371 generates relative height information, which is information representing the relative positional relationship between the Z-axis-direction component of the calculated position in the robot coordinate system RC and the Z-axis-direction component of the current position of the movable section A. The generation section 371 causes the storage 32 to store the generated relative height information. The generation section 371 may calculate the position described above by using another method. The relative height information is information used in the process described in FIG. 13 and is therefore not used in the processes in the flowchart shown in FIG. 11. The reference position is an example of the first position.

The generation section 371 then generates reference position information representing the reference position identified in step S370 and causes the storage 32 to store the generated reference position information (step S380). The generation section 371, when it causes the storage 32 to store the reference position information, relates the order information representing the order related to the target start positions selected in step S320 to the reference position information. The robot control section 373 then transitions to step S320 and selects the next target start position. In a case where no unselected start position is present in step S320, the robot control section 373 transitions to step S390.

After the processes in step S320 to S380 are repeatedly carried out, based on reference positions indicated by the three pieces of reference position information stored in the storage 32, the generation section 371 generates, as information according to the flat plane containing all the three reference positions, information representing the flat plane coordinate system FC representing the position on the flat plane, and the generated information corresponds to the third teaching information (step S390). At this point, the generation section 371 causes the position of the origin of the flat plane coordinate system FC in the robot coordinate system RC to coincide with the reference position related to the earliest selection in the order described above out of the three reference positions. Since a position in the flat plane coordinate system FC is thus related to a position in the robot coordinate system RC, the robot control section 373 can convert the position in the flat plane coordinate system FC into the position in the robot coordinate system RC. The generation section 371 generates, as the third teaching information, the information representing the flat plane coordinate system FC in such a way that the X and Y axes of the flat plane coordinate system FC are parallel to the flat plane described above. The set of positions each having the Z coordinate of zero out of the positions in the flat plane coordinate system FC therefore represents a flat plane containing the upper surface of the target object O as a partial flat plane. The generation section 371 causes the storage 32 to store the generated third teaching information (step S400) and terminates the third process.

Figure 12:
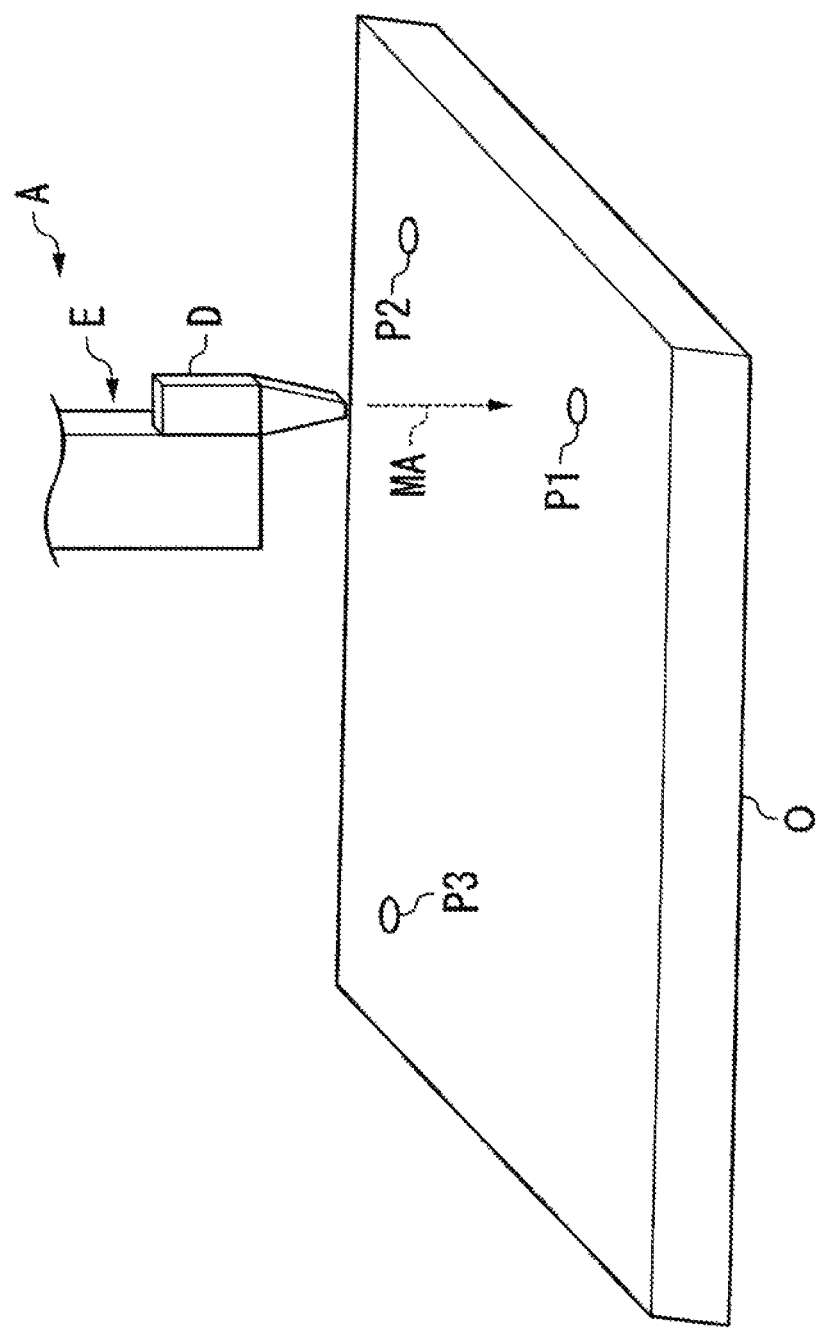
FIG. 12 describes the processes in step S320 to S390.

The processes in step S320 to S390 will be described with reference to FIG. 12. FIG. 12 describes the processes in step S320 to S390. FIG. 12 shows the positional relationship between the movable section A and the target object O in a state in which the position of the movable section A coincides with the first reference position in the order described above after the process in step S330. In the example shown in FIG. 12, the upper surface of the target object O is not parallel to the XY plane in the robot coordinate system RC.

In the process in step S340 in the case where the first reference position in the order described above is selected as the target reference position, the robot control section 373 moves the movable section A under the force control in the direction indicated by the arrow MA, that is, downward in this example. The robot control section 373 thus causes the front end of the jig J to come into contact with the upper surface of the target object O. The point P1 shown in FIG. 12 represents the position where the front end of the jig J comes into contact with the upper surface of the target object O after the process in step S340. The point P2 shown in FIG. 12 represents the position where the front end of the jig J comes into contact with the upper surface of the target object O after the process in step S340 in a case where the second reference position in the order described above out of the positions on the upper surface is selected as the target reference position. The point P3 shown in FIG. 12 represents the position where the front end of the jig J comes into contact with the upper surface of the target object O after the process in step S340 in a case where the third reference position in the order described above out of the positions on the upper surface is selected as the target reference position.

The generation section 371 generates, as the third teaching information, the information representing the flat plane coordinate system FC described above based on the reference positions indicated by the points P1 to P3. The flat plane coordinate system FC shown in FIG. 12 is the flat plane coordinate system FC indicated by the third teaching information generated by the generation section 371 as described above. In FIG. 12, the origin of the flat plane coordinate system FC is so drawn as not to coincide with the position indicated by the point P1 to avoid complication in FIG. 12. As shown in FIG. 2, since the flat plane containing all the reference positions indicated by the points P1 to P3, that is, the flat plane containing the upper surface of the target object O as a partial flat plane is not parallel to the XY plane of the robot coordinate system RC, the XY plane of the flat plane coordinate system FC is not parallel to the XY plane of the robot coordinate system RC. Even in the case where the XY planes are not parallel to each other, as in the example shown in FIG. 12, the robot controller 30 can move the movable section A along the upper surface of the target object O based on the third teaching information. As a result, the robot controller 30 can avoid a situation in which the discharge object applied onto the upper surface has applied object speckles (application unevenness).

Figure 13:
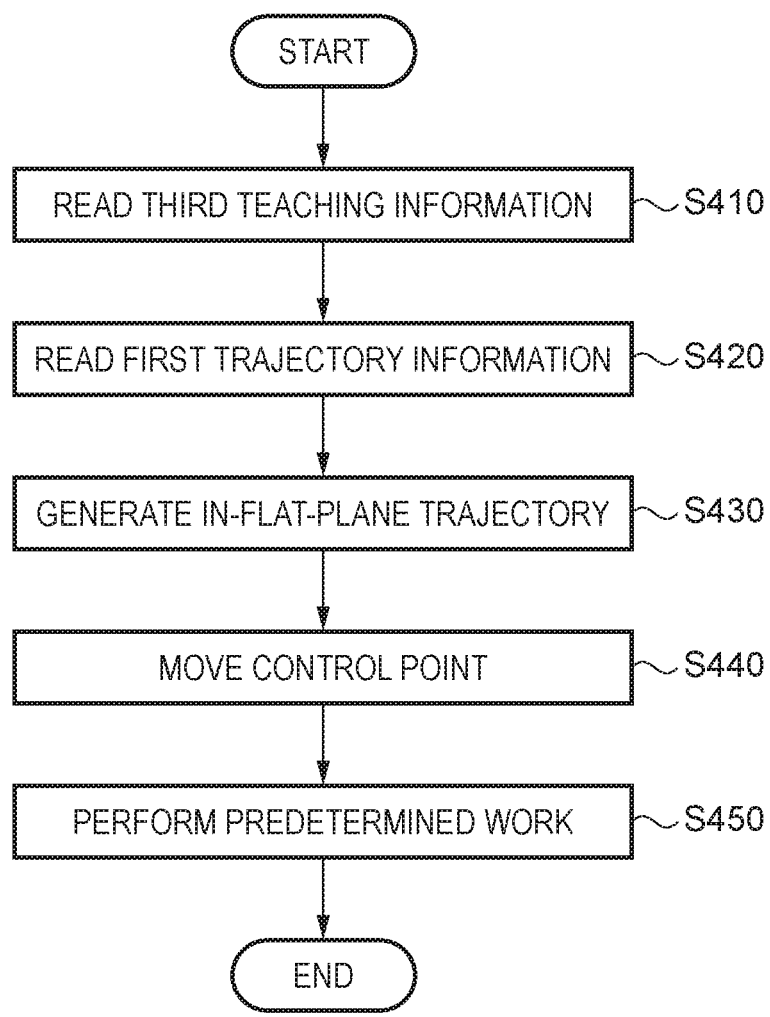
FIG. 13 shows an example of the procedure of the process in which the robot controller causes the robot to perform predetermined work based on third teaching information generated in the processes in the flowchart shown in FIG. 11.

The process in which the robot controller 30 causes the robot 20 to perform predetermined work based on the third teaching information generated in the processes in the flowchart shown in FIG. 11 will next be described with reference to FIG. 13. FIG. 13 shows an example of the procedure of the process in which the robot controller 30 causes the robot 20 to perform predetermined work based on the third teaching information generated in the processes in the flowchart shown in FIG. 11. The predetermined work in this example is work of applying the discharge object onto the upper surface of the target object O while moving the movable section A along the upper surface in such a way that the movable section A follows a predetermined trajectory. The predetermined work may instead be another type of work. The flowchart shown in FIG. 13 will be described with reference to a case where the jig J is removed from the discharger D before the process in step S410 is carried out.

The robot control section 373 reads the third teaching information stored in the storage 32 in advance from the storage 32 (step S410). The robot control section 373 then reads first trajectory information stored in the storage 32 in advance from the storage 32 (step S420). The first trajectory information is information representing the trajectory representing changes in the position and attitude of the movable section A in the predetermined work that the robot controller 30 causes the robot 20 to perform. In this example, the trajectory represents changes in the position of the movable section A that moves along the XY plane in the robot coordinate system RC. The position of each point on the trajectory is expressed by the combination of the X and Y coordinates in the robot coordinate system RC. That is, the trajectory is not defined in terms of the position in the Z-axis direction in the robot coordinate system RC. In this example, the trajectory is present inside the contour of the target object O when the upper surface of the target object O is viewed in the direction from the positive side of the Z axis toward the negative side thereof in the robot coordinate system RC. Part of the trajectory may instead not be present inside the contour. The attitude of each point on the trajectory is expressed by the combination of a U coordinate, a V coordinate, and a W coordinate in the robot coordinate system RC. The U coordinate is the coordinate representing the pivotal axis around the X axis in the robot coordinate system RC. The V coordinate is the coordinate representing the pivotal axis around the Y axis in the robot coordinate system RC. The W coordinate is the coordinate representing the pivotal axis around the Z axis in the robot coordinate system RC.

The generation section 371 then reads the aforementioned relative height information stored in the storage 32. The generation section 371 generates an on-flat-plane trajectory, which is the trajectory representing changes in the position of the movable section A in the predetermined work that the robot 20 is caused to perform and extending along the XY plane in the flat plane coordinate system FC, based on the read relative height information, the third teaching information read from the storage 32 in step S410, and the first trajectory information read from the storage 32 in step S420 (step S430). Specifically, the generation section 371 identifies, as the flat plane containing the upper surface of the target object O as a partial plane, a set of positions present in the flat plane coordinate system FC indicated by the third teaching information and each having a Z coordinate that coincides with the Z coordinate of the origin of the flat plane coordinate system FC. The generation section 371 converts the trajectory indicated by the first trajectory information into a trajectory along the flat plane defined by the set of positions present in the flat plane coordinate system FC and each having the Z coordinate of zero (that is, the same Z coordinate as that of the origin). Based on the converted trajectory and the positional relationship indicated by the relative height information, the generation section 371 generates, as the on-flat-surface trajectory, a trajectory representing changes in the position of the movable section A in accordance with changes in the position of the marker MK along the trajectory.

The robot control section 373 then causes the position of the movable section A to coincide with the position of a start point out of the points on the on-flat-plane trajectory generated in step S430 by moving the control point T (step S440). The robot control section 373 then controls the discharge control section 365 to cause the discharger D to discharge the discharge object and changes the position of the movable section A along the trajectory to cause the robot 20 to perform the predetermined work (step S450). The robot controller 30 can thus change the position of the movable section A based on the trajectory along the upper surface of the target object O. As a result, the robot controller 30 can cause the robot 20 to precisely perform the work of applying the discharge object onto predetermined positions on the target object O. Further, since the movable section A and the discharger D can be moved along the upper surface, the robot controller 30 can avoid the situation in which the discharge object applied onto the upper surface has applied object speckles (application unevenness). After the process in step S450 is carried out, the robot control section 373 terminates the process.

Process of Generating Fourth Teaching Information, Which is Fourth Specific Example of Teaching Information A description will be made of fourth teaching information, which is a fourth specific example of the teaching information on the position of the movable section A, and a fourth process, which is the process in which the robot controller 30 generates the fourth teaching information.

In this example, the description will be made of a case where the target object that is the target on which the robot 20 performs work is a target object O2 in place of the target object O described above. The target object O2 is a flat plate as in the case of the target object O but has irregularities on the upper surface, unlike the target object O.

To allow the robot controller 30 to carry out the fourth process, the end effector E is provided with a distance detector (see FIG. 15) that moves along with the discharger D. The distance detector is, for example, a laser displacement meter. The distance detector irradiates the surface of an object with a laser beam and detects the distance from the position where the surface is irradiated with the laser beam to the position of the distance detector based on the period that elapses until the laser beam reflected off the surface is received. The distance detector may instead be a touch sensor, a load cell, or any other sensor that is not a laser displacement meter but can detect the distance described above. The distance detector outputs distance information representing the detected distance to the robot controller 30. The distance information is an example of the output from the distance detector. The position of the distance detector is expressed, for example, in the form of the position of the center of gravity of the distance detector. The position of the distance detector is not necessarily expressed in the form of the position of the center of gravity and may instead be expressed in the form of another position according to the distance detector.

The following description will be made of a case where the direction in which the distance detector radiates the laser beam coincides with the discharge direction described above. The direction in which the distance detector radiates the laser beam may instead coincide with a direction different from the discharge direction.

In the case where the end effector E is provided with the distance detector, the control section 36 provided in the robot controller 30 includes a distance detection control section that is not shown but causes the distance detector to detect the distance. The distance detection control section acquires distance information representing the distance detected with the distance detector from the distance detector.

The fourth teaching information is information representing a trajectory that accords with the irregularities formed on the upper surface of the target object O2 and represents changes in the position and attitude of the movable section A in predetermined work performed by the robot 20. That is, the robot controller 30 carries out the fourth process to generate, as the fourth teaching information, information representing the trajectory that accords with the irregularities and represents changes in the position of the movable section A in the predetermined work performed by the robot 20. The position of each point on the trajectory indicated by the fourth teaching information is expressed by the combination of the X, Y and Z coordinates in the robot coordinate system RC.

Similar to the case of the target object O, in the case where the robot controller 30 is caused to store the position of the discharger D (is taught position of discharger D) in the case where the discharger D, which is a noncontact discharger, applies the discharge object onto a predetermined position on the target object O2, the user needs to evaluate whether or not the position of the discharger D coincides with the position that allows the discharger D to discharge the discharge object to a desired position where the user desires to apply the discharge object. The robot controller 30 cannot therefore precisely generate in some cases the fourth teaching information representing the user's desired trajectory representing changes in the position and attitude of the movable section A in the work in which the robot 20 applies the discharge object onto a predetermined position on the target object O2. To solve the problem described above, the robot controller 30 uses the first position based on the jig J removably attached to the discharger D to generate the fourth teaching information in the process that will be described below.

In the case where the robot controller 30 generates the fourth teaching information, the first position based on the jig J removably attached to the discharger D is the position of the movable section A in the state in which the front end of the jig J attached to the discharger D is in contact with the surface of the target object O2. In this example, the robot controller 30 generates the fourth teaching information based on the distance information representing the distance detected by the distance detector and on the first position.

Figure 14:
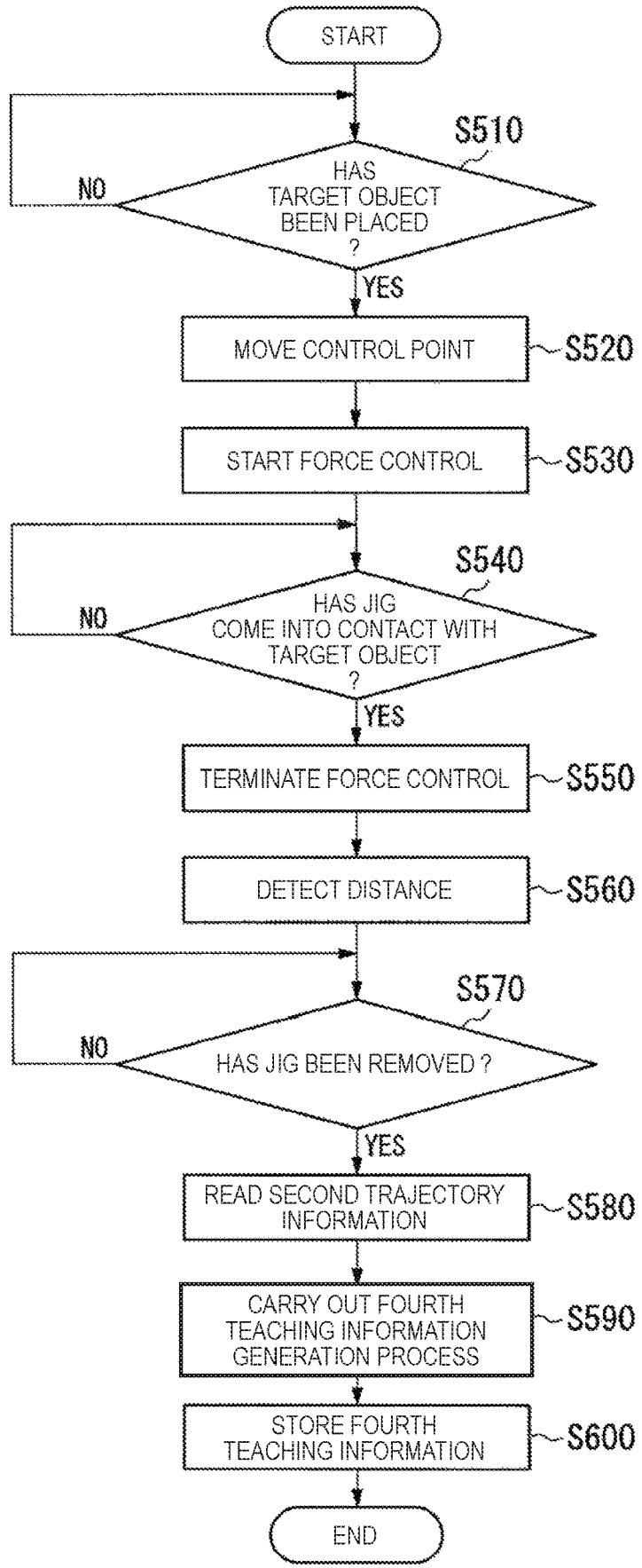
FIG. 14 is a flowchart showing an example of the procedure of a fourth process carried out by the robot controller.

The fourth process, which is the process in which the robot controller 30 generates the fourth teaching information, will be described with reference to FIG. 14. FIG. 14 is a flowchart showing an example of the procedure of the fourth process carried out by the robot controller 30. The flowchart shown in FIG. 14 will be described with reference to a case where the robot controller 30 accepts in advance the user's operation of starting the fourth process before the process in step S510 is carried out. The robot controller 30 accepts the user's operation of starting the fourth process, for example, via the operation screen described above. The flowchart will also be described with reference to the case where the jig J is attached in advance to the discharger D before the process in step S510 is carried out. The robot controller 30 may instead accept the user's operation of starting the fourth process by using another method.

The robot control section 373 waits until the user places the target object O2 in a predetermined position on the upper surface of the work bench TB (step S510). The robot controller 30, when it accepts information representing that the target object O2 has been placed in the position from the user, for example, via the operation screen described above, determines that the user has placed the target object O2 in the position. In a case where the result of the evaluation shows that the user has placed the target object O2 in the position (YES step S510), the robot control section 373 moves the control point T in such a way that the position and attitude of the movable section A coincide with a predetermined wait position and wait attitude in the robot coordinate system RC (step S520). The wait position in this example may be any position that allows the front end of the jig J attached to the discharged D to come into contact with the upper surface of the target object O2 by moving the control point T downward. The wait position in this example is not only a position where the X and Y coordinates in the robot coordinate system RC that represent the wait position viewed downward from above coincide with the X and Y coordinates in the robot coordinate system RC that represent the position of the start point of the trajectory indicated by second trajectory information read by the robot control section 373 from the storage 32 in step S580 and coincide with the X and Y coordinates in the robot coordinate system RC but a position where the wait position has a predetermined Z-axis-direction component in the robot coordinate system RC and the jig J does not come into contact with the target object O2. The wait attitude in this example is the attitude of the movable section A in the case where the discharge direction coincides with the downward direction.

The robot control section 373 then starts the force control (step S530). Specifically, the robot control section 373 starts moving the position of the control point T in such a way that the magnitude of external force detected with the force detector 21 and acting toward the positive side of the Z axis in the robot coordinate system RC is greater than or equal to a predetermined threshold. That is, the robot control section 373 starts moving the position of the control point T under the force control toward the negative side of the Z axis. The threshold is, for example, 0.1 N. The threshold is not necessarily 0.1 N and may be smaller than or greater than 0.1 N.

The robot control section 373 then evaluates whether or not the front end of the jig J attached to the discharger D has come into contact with the upper surface of the target object O2 (step S540). The robot control section 373, when it determines that the magnitude of the external force detected with the force detector 21 and acting toward the positive side of the Z axis in the robot coordinate system RC is greater than or equal to the predetermined threshold, determines that the front end has come into contact with the upper surface. On the other hand, the robot control section 373, when it determines that the magnitude of the external force detected with the force detector 21 and acting toward the positive side of the Z axis in the robot coordinate system RC is smaller than the predetermined threshold, determines that the front end has not come into contact with the upper surface. Specifically, the robot control section 373 causes the force detection information acquisition section 369 to acquire the force detection information from the force detector 21. The robot control section 373, when it determines that the magnitude of the external force indicated by the output value contained in the force detection information acquired by the force detection information acquisition section 369 and acting toward the positive side is smaller than the predetermined threshold (NO in step S540), determines that the front end has not come into contact with the upper surface and keeps carrying out the process in step S530. On the other hand, the robot control section 373, when it determines that the magnitude of the external force indicated by the output value contained in the force detection information acquired by the force detection information acquisition section 369 and acting toward the positive side is greater than or equal to the predetermined threshold (YES in step S540), the generation section 371 determines that the front end has come into contact with the upper surface and terminates the force control having started in step S530 to stop moving the movable section A (step S550).

The distance detection control section described above then causes the distance detector to radiate the laser beam and causes the distance detector to detect the distance between the position irradiated with the laser beam from the distance detector out of the positions on the surface of the target object O2 and the position of the distance detector (step S560). The distance detection control section then acquires the distance information representing the distance detected with the distance detector from the distance detector. The distance detection control section causes the storage 32 to store the acquired distance information.

Figure 15:
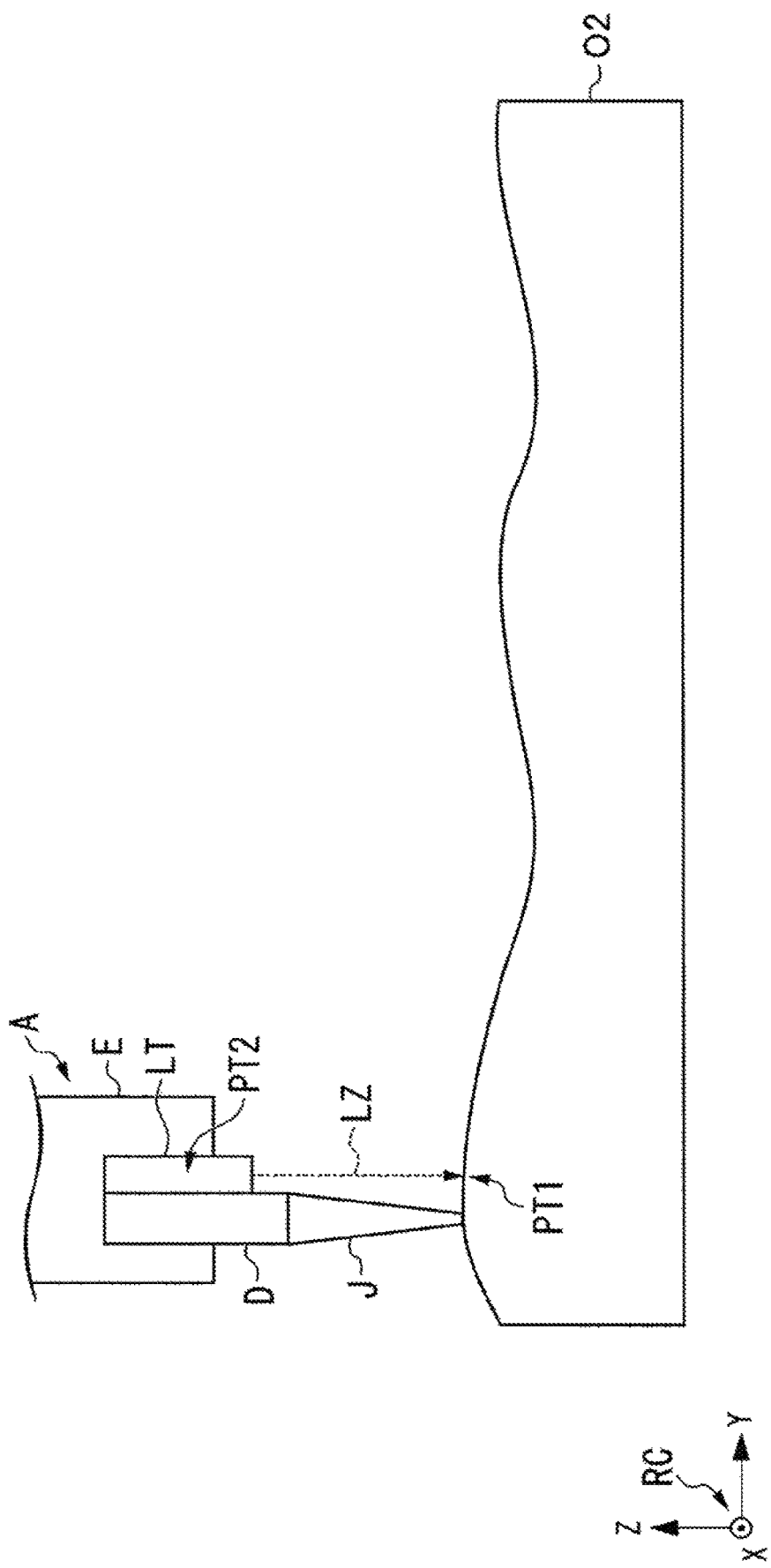
FIG. 15 describes the processes in step S530 to S560.

The processes in step S530 to S560 will be described with reference to FIG. 15. FIG. 15 describes the processes in step S530 to S560. FIG. 15 shows the positional relationship between the movable section A and the target object O2 in a state in which the front end of the jig J attached to the discharger D comes into contact with the upper surface of the target object O2 when the processes in steps S530 to S550 are carried out. In the example shown in FIG. 15, irregularities are formed on the upper surface of the target object O2, as described above. A distance detector LT shown in FIG. 15 is an example of the distance detector described above. The arrow LZ represents the laser beam radiated from the distance detector. In the state described above, the distance detection control section causes the distance detector to detect the distance between a position PT1 irradiated with the laser beam from the distance detector out of the positions on the surface of the target object O2 and a position PT2 of the distance detector. The distance described above is the distance in the Z-axis direction in the robot coordinate system RC.

After the process in step S560 is carried out, the robot control section 373 causes the storage 32 to store position/attitude information representing the current position and attitude of the movable section A. The position is an example of the first position. The robot control section 373 then moves the movable section A to cause the position and attitude of the movable section A to coincide with the wait position and the wait attitude described above. The robot control section 373 then waits until the jig J attached to the discharger D is removed from the discharger D (step S570). The robot control section 373, when it accepts information representing that the jig J has been removed from the discharger D from the user, for example, via the operation screen described above, determines that the jig J has been removed from the discharger D. The robot control section 373 may instead accept the information from the user by using another method. In the case where the result of the evaluation shows that the jig J has been removed from the discharger D (YES in step S570), the robot control section 373 reads the second trajectory information stored in the storage 32 in advance from the storage 32 (step S580). The second trajectory information is information representing the trajectory representing changes in the position and attitude of the movable section A in the predetermined work that the robot controller 30 causes the robot 20 to perform. In this example, the trajectory represents changes in the position of the movable section A that moves along the XY plane in the robot coordinate system RC. The position of each point on the trajectory is expressed by the combination of the X and Y coordinates in the robot coordinate system RC. That is, the trajectory is not defined in terms of the position in the Z-axis direction in the robot coordinate system RC. The trajectory in this example is located inside the contour of the target object O2 when the upper surface of the target object O2 is viewed from the positive side of the Z axis toward the negative side thereof in the robot coordinate system RC. The attitude of each point on the trajectory is expressed by the combination of the U, V, and W coordinates in the robot coordinate system RC.

The robot control section 373 and the generation section 371 then carry out fourth teaching information generation process (step S590). Specifically, the robot control section 373 reads the position/attitude information stored in the storage 32. The robot control section 373 causes the position and attitude of the movable section A to coincide with the position and attitude indicated by the read position/attitude information. The robot control section 373 reads the distance information stored in the storage 32 in step S560. The robot control section 373 changes the position of the movable section A along the trajectory indicated by the second trajectory information read from the storage 32 in step S580 and controls the discharge control section 365 to cause the discharger D to discharge the discharge object. At this point, the robot control section 373 controls the movable section A while controlling the distance detection control section to cause the distance detector to radiate the laser beam and change the position of the movable section A along the trajectory in such a way that the distance between the position irradiated with the laser beam from the distance detector out of the positions on the surface of the target object O2 and the position of the distance detector is equal to the distance indicated by the distance information read from the storage 32. At this point, the generation section 371 generates, as the fourth teaching information, information representing the trajectory representing changes in the position and attitude of the movable section A under the control performed by the robot control section 373.

The generation section 371 then causes the storage 32 to store the fourth teaching information generated in step S590 (step S600) and terminates the fourth process.

As described above, the robot controller 30 carries out the fourth process, that is, the processes in the flowchart shown in FIG. 14 to generate the fourth teaching information based on the distance information representing the distance detected with the distance detector and the first position based on the jig J (position out of position and attitude indicated by position/attitude information in this example). The robot controller 30 can therefore change the position of the movable section A in the Z-axis direction in the robot coordinate system RC in accordance with the irregularities on the upper surface while moving the movable section A along a certain trajectory along the XY plane in the robot coordinate system RC and apply the discharge object along the trajectory on the upper surface of the target object O2 with the distance from the position of landing at the point of time of discharge of the discharge object from the discharger D to the discharge port EH roughly maintained. As a result, the robot controller 30 can avoid the situation in which the discharge object applied onto the upper surface has applied object speckles (application unevenness).

Figure 16:
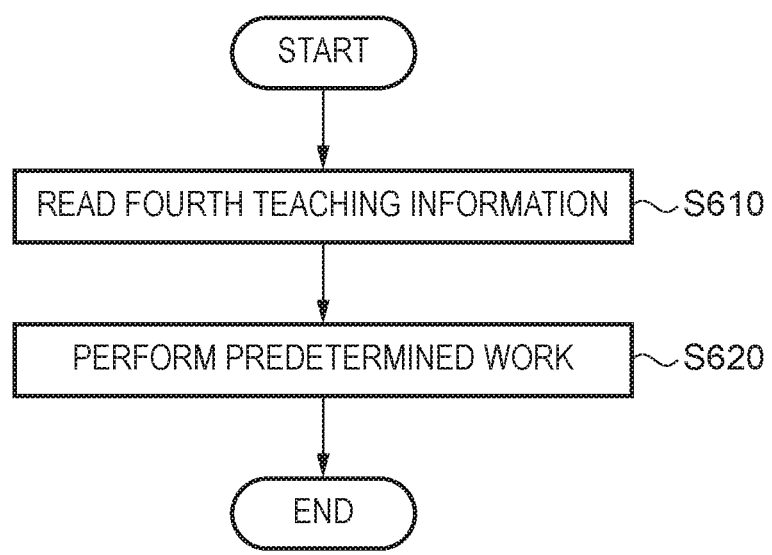
FIG. 16 shows an example of the procedure of the process in which the robot controller causes the robot to carry out predetermined work based on fourth teaching information generated in the processes in the flowchart shown in FIG. 14.

The process in which the robot controller 30 causes the robot 20 to carry out the predetermined work based on the fourth teaching information generated in the processes in the flowchart shown in FIG. 14 will next be described with reference to FIG. 16. FIG. 16 shows an example, of the procedure of the process in which the robot controller 30 causes the robot 20 to carry out the predetermined work based on the fourth teaching information generated in the processes in the flowchart shown in FIG. 14. The predetermined work is work of applying the discharge object on the upper surface of the target object while moving the movable section A along the upper surface in such a way that the movable section A follows a predetermined trajectory. The predetermined work may instead be another type of work. The flowchart shown in FIG. 16 will be described with reference to the case where the jig J is removed from the discharger D before the process in step S610 is carried out.

The robot control section 373 reads the fourth teaching information stored in the storage 32 in advance from the storage 32 (step S610). The robot control section 373 then causes the position of the movable section A to coincide with the position of the start point out of the points on the trajectory indicated by the fourth teaching information read from the storage 32 in step S610. The robot control section 373 then controls the discharge control section 365 to cause the discharger D to discharge the discharge object, changes the position of the movable section A along the trajectory, and causes the robot 20 to perform the predetermined work (step S620). The robot controller 30 can therefore change the position of the movable section A in the Z-axis direction in the robot coordinate system RC in accordance with the irregularities on the upper surface of the target object O2 while moving the movable section A along a certain trajectory along the XY plane in the robot coordinate system RC and apply the discharge object onto the upper surface along the trajectory with the distance from the position of landing at the point of time of discharge of the discharge object from the discharger D to the discharge port EH roughly maintained. As a result, the robot controller 30 can avoid the situation in which the discharge object applied onto the upper surface has applied object speckles (application unevenness).

Process of Generating Fifth Teaching Information, Which is Fifth Specific Example of Teaching Information A description will be made of fifth teaching information, which is a fifth specific example of the teaching information on the position of the movable section A, and a fifth process, which is the process in which the robot controller 30 generates the fifth teaching information.

In this example, the description will be made of the case where a target object on which the robot 20 performs work is the target object O2, as in the fourth specific example of the teaching information. In this example, however, the end effector E is provided with no distance detector, unlike the fourth specific example. The control section 36 of the robot controller 30 is therefore provided with no distance detection control section.

The fifth teaching information is information representing a trajectory that accords with the irregularities formed on the upper surface of the target object O2 and represents changes in the position and attitude of the movable section A in predetermined work performed by the robot 2. The fifth teaching information is information stored through direct teaching. That is, the robot controller 30 carries out the fifth process based on direct teaching to generate, as the fifth teaching information, information representing the trajectory that accords with the irregularities and represents changes in the position and attitude of the movable section A in the predetermined work performed by the robot 20. The position of each point on the trajectory indicated by the fifth teaching information is expressed by the combination of the X, Y and Z coordinates in the robot coordinate system RC. The attitude of each point on the trajectory indicated by the fifth teaching information is expressed by the combination of the U, V, and W coordinates in the robot coordinate system RC.

Figure 17:
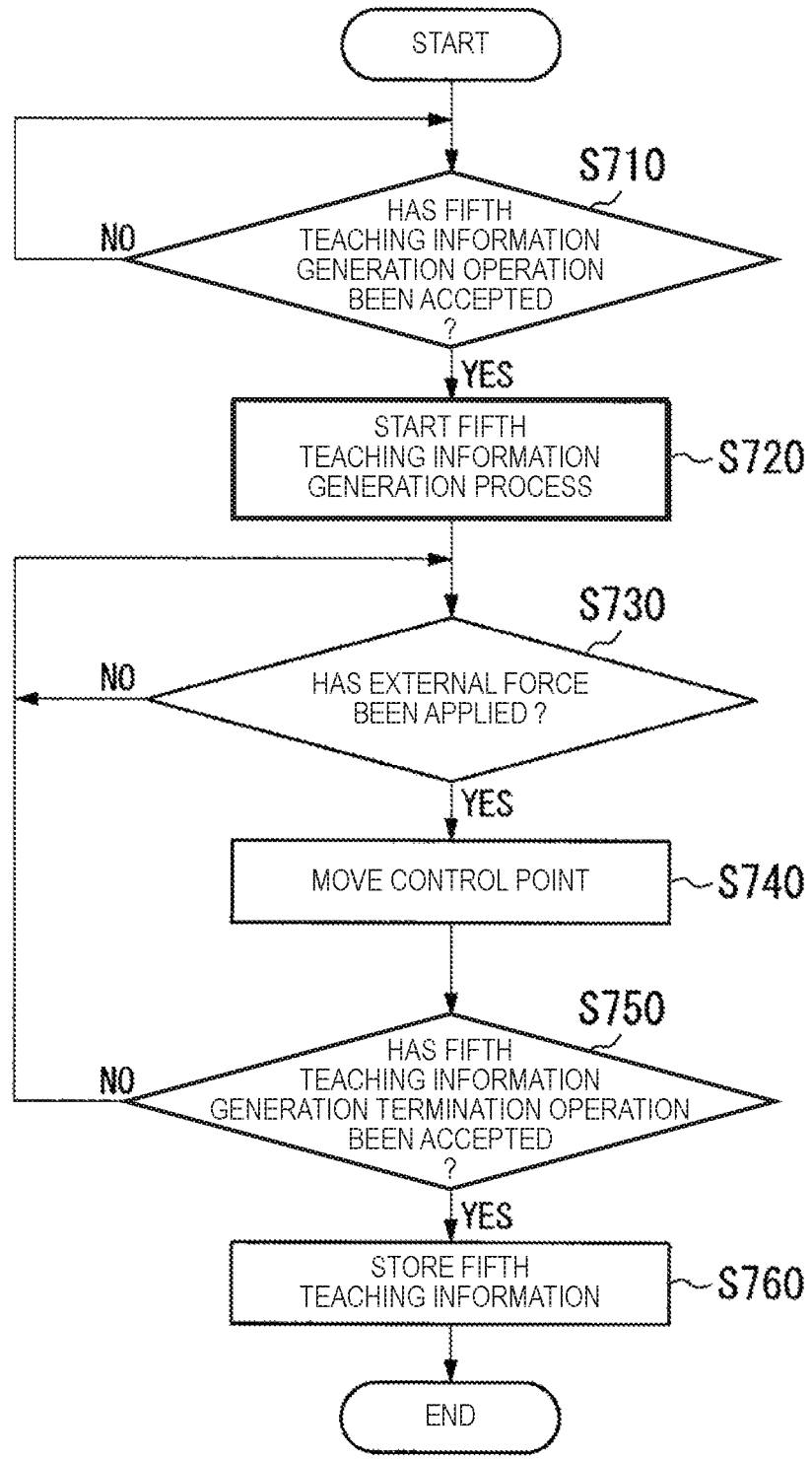
FIG. 17 is a flowchart showing an example of the procedure of a fifth process carried out by the robot controller.

The fifth process, which is the process in which the robot controller 30 generates the fifth teaching information, will be described with reference to FIG. 17. FIG. 17 is a flowchart showing an example of the procedure of the fifth process carried out by the robot controller 30. The flowchart shown in FIG. 17 will be described with reference to a case where the robot controller 30 accepts in advance the user's operation of starting the fifth process before the process in step S710 is carried out. The robot controller 30 accepts the user's operation of starting the fifth process, for example, via the operation screen described above. The flowchart will also be described with reference to the case where the jig J is attached in advance to the discharger D before the process in step S710 is carried out. The robot controller 30 may instead accept the user's operation of starting the fifth process by using another method.

The robot control section 373 waits until it accepts fifth teaching information generation operation, which is the operation of causing the robot controller 30 to generate the fifth teaching information, from the user. The robot control section 373 accepts the fifth teaching information generation operation from the user, for example, via the operation screen described above. The robot control section 373 may instead accept the fifth teaching information generation operation from the user by using another method. In a case where the robot control section 373 determines that it has accepted the fifth teaching information generation operation from the user (YES in step S710), the generation section 371 starts a fifth teaching information generation process of generating, as the fifth teaching information, information representing the trajectory representing changes in the position and attitude of the movable section A that have occurred until the robot control section 373 determines that it has accepted operation of terminating the fifth teaching information generation process in step S750 (step S720).

The robot control section 373 waits until external force is applied to the movable section A (step S730). Specifically, the robot control section 373 causes the force detection information acquisition section 369 to acquire the force detection information from the force detector 21. The robot control section 373 then evaluates whether or not external force has been applied to the movable section A based on the output value contained in the force detection information acquired by the force detection information acquisition section 369. In a case where the result of the evaluation shows that external force has been applied to the movable section A (YES in step S730), the robot control section 373 moves the control point T under the force control based on the external force applied to the movable section A to change the position and attitude of the movable section A (step S740). In this example, the force control is impedance control, as described above.

The robot control section 373 then evaluates whether or not it has accepted the user's operation of terminating the fifth teaching information generation process (step S750). The robot control section 373 accepts the operation, for example, via the operation screen described above. The robot control section 373 may instead accept the operation from the user by using another method. In a case where the robot control section 373 determines that it has not accepted the operation from the user (No in step S750), the robot control section 373 transitions to step S730 and waits again until external force is applied to the movable section A. On the other hand, in a case where the robot control section 373 determines that it has accepted the operation from the user (YES in step S750), the generation section 371 generates, as the fifth teaching information, information representing the trajectory representing changes in the position and attitude of the movable section A that have occurred since the fifth teaching information generation process started in step S720 but until the current point of time. The generation section 371 then causes the storage 32 to store the generated fifth teaching information (step S760) and terminates the fifth process.

At this point, in the case where the jig J has been attached to the discharger D before the processes in steps S720 to S750, the user can move the movable section A by applying external force to the movable section A under the force control performed by the robot controller 30 and cause the robot controller 30 to store, as the fifth teaching information, information representing the trajectory representing changes in the position and attitude of the movable section A in the state in which the front end of the jig J is in contact with a predetermined position on the target object O2 that is a desired position where the user desires to apply the discharge object. That is, the position of the front end of the jig J in the state in which the front end is in contact with the target object O2 (that is, position of marker MK) is the desired position where the user desires to apply the discharge object and an example of the first position in this example. Further, the user can cause the changes in the position and attitude of the discharger D to coincide with changes in the user's desired position and attitude with the front end of the jig J being in contact with the desired position where the user desires to apply the discharge object (that is, with position and attitude of discharger D caused to coincide with position and attitude that allow discharge object to be discharged to desired position). As a result, the user can readily cause the robot controller 30 to store, as the fifth teaching information, the information representing the trajectory representing the changes in the user's desired position and attitude of the discharger D that allow the discharge object to be discharged to the desired position where the user desires to apply the discharge object.

As described above, the robot controller 30 carries out the fifth process, that is, the processes in the flowchart shown in FIG. 17 to generate the fifth teaching information by using the first position based on the jig J (in this example). The robot controller 30 can thus precisely move the position of the discharger D to the user's desired position by moving the movable section A. As a result, the robot controller 30 can cause the robot 20 to precisely perform the work of applying the discharge object onto a predetermined position on the target object O2.

In the above description, the discharger D is a noncontact dispenser and may instead be a contact-type dispenser including a needle. In a case where the jig J is used in this case, the jig J is attached to the discharger D in place of the needle. The robot controller 30 can thus carry out the processes described above even in the case where the discharger D is a contact-type dispenser.

In the above description, in the case where the movable section A moves the discharger D relative to the target object O (or target object O2), the robot controller moves the control point T to move the discharger D provided in the movable section A. Instead, the robot controller 30 may move the target object O (or target object O2) sucked by the end effector E relative to the discharger D so fixed to a predetermined position as to be immobile. In a case where the robot 20 is a double-arm robot, the robot controller 30 may move the discharger D by using a first movable section out of two movable sections provided in the double-arm robot and move the target object O (or target object O2) by using a second movable section out of the two movable sections to change the relative positional relationship between the movable section A and the target object O (or target object O2).

The robot controller 30 may be capable of generating part of the first to fifth teaching information described above or may be capable of generating the entirety of the first to fifth teaching information described above. In place of part or entirety of the first to fifth teaching information described above, the robot controller 30 may generate another piece of teaching information by using another first position, or in addition to the entirety of the first to fifth teaching information, the robot controller 30 may generate another piece of teaching information by using another first position.

The jig J described above may have a characteristic shape in place of the marker MK.

As described above, the robot controller 30 uses the first position based on a jig (jig J in this example) removably attached to a discharger (discharger D in this example) to generate teaching information (any of the first to fifth teaching information in this example) on the position of a movable section (movable section A in this example). The robot controller 30 can therefore cause a robot (robot 20 in this example) to precisely perform work of applying a discharge object onto a predetermined position on a target object (target object O or target object O2 in this example).

The robot controller 30 calculates the first position based on the output (force detection information in this example) from a force detector (force detector 21 in this example) provided in the movable section. The robot controller 30 can therefore cause the robot to precisely perform the work of applying the discharge object onto the predetermined position on the target object by using the first position calculated based on the output from the force detector.

The robot controller 30 uses the first position based on the jig removably attached to the discharger to generate teaching information concerning the position of the movable section and containing information according to a shape based on at least three first positions (third teaching information in this example). The robot controller 30 can therefore cause the robot to precisely perform the work of applying the discharge object onto the predetermined position on the target object based on the teaching information containing the information according to the shape based on the at least three first positions.

The robot controller 30 uses the first position based on the jig removably attached to the discharger to generate teaching information concerning the position of the movable section and containing information according to a flat plane based on at least three first positions (third teaching information, which is information representing flat plane coordinate system FC in this example). The robot controller 30 can therefore cause the robot to precisely perform the work of applying the discharge object onto the predetermined position on the target object based on the teaching information containing the information according to the flat plane based on the at least three first positions.

The robot controller 30 can generate teaching information through direct teaching (any of second teaching information and fourth teaching information in this example). The robot controller 30 can therefore cause the robot to precisely perform the work of applying the discharge object onto the predetermined position on the target object based on the teaching information generated through the direct teaching.

The robot controller 30 uses the first position based on the jig removably attached to the discharger and including the position of a marker provided on the jig (marker MK in this example) to generate teaching information on the position of the movable section (first teaching information in this example). The robot controller 30 can therefore cause the robot to precisely perform the work of applying the discharge object onto the predetermined position on the target object by using the first position including the position of the marker provided on the jig.

The robot controller 30 uses the first position based on the jig removably attached to the discharger to generate teaching information containing information representing a positional relationship that is determined by using the position of the marker detected with an imager and is the relative positional relationship between the position of the discharger and the position of the movable section (first teaching information in this example). The robot controller 30 can therefore cause the robot to precisely perform the work of applying the discharge object onto the predetermined position on the target object based on the teaching information containing the information representing the positional relationship that is determined by using the position of the marker detected with the imager (imager 10 in this example) and is the relative positional relationship between the position of the discharger and the position of the movable section.

The robot controller 30 uses the first position based on the jig removably attached to the discharger to generate teaching information (first teaching information in this example) containing information representing the positional relationship that is determined by using the position of the marker detected with the imager and the position of landing of the discharge object detected with the imager and is the relative positional relationship between the position of the marker and the position of landing. The robot controller 30 can therefore cause the robot to precisely perform the work of applying the discharge object onto the predetermined position on the target object based on the teaching information containing the information representing the positional relationship that is determined by using the position of the marker detected with the imager and the position of landing of the discharge object detected with the imager and is the relative positional relationship between the position of the marker and the position of landing.

The robot controller 30 uses the first position based on the jig removably attached to the discharger and having a variable length in the discharge direction to generate teaching information on the position of the movable section (any of first to fifth teaching information in this example). The robot controller 30 can therefore cause the robot to precisely perform the work of applying the discharge object onto the predetermined position on the target object by using the first position based on the jig removably attached to the discharger and having a variable length in the discharge direction.

The robot controller 30 generates teaching information (fourth teaching information in this example) based on the output from the distance detector provided in the movable section (distance information in this example) and the first position. The robot controller can therefore cause the robot to precisely perform the work of applying the discharge object onto the predetermined position on the target object based on the output from the distance detector provided in the movable section and the first position.

The embodiments of the invention have been described in detail with reference to the drawings, but the specific configurations of the invention are not limited to those in the embodiments and can be changed, replaced, deleted, or otherwise modified to the extent that the changes, replacements, deletions, or other modifications do not depart from the substance of the invention.

A program for achieving the function of an arbitrary constituent part in each of the apparatus described above (robot controller 30, for example) may be recorded on a computer readable recording medium, and the program may be read and executed by a computer system. The term "computer system" used herein is assumed to include an OS (operating system) and hardware, such as a peripheral apparatus. The term "computer readable recording medium" refers to a portable medium, such as a flexible disk, a magneto-optical disk, a ROM, and a CD-ROM (compact disc ROM), and a storage device built in the computer system, such as a hard disk drive. Further, the "computer readable recording medium" is assumed to encompass a component that holds a program for a fixed period, such as a volatile memory (RAM) in a computer system that works as a server or a client in a case where the program is transmitted over the Internet or any other network or a telephone circuit or any other communication circuit.

The program described above may be transmitted from the computer system including the storage device or any other component that stores the program to another computer system via a transmission medium or a transmission wave traveling through a transmission medium. The term "transmission medium" used herein, through which the program is transmitted, refers to a medium having the function of transmitting information, such as the Internet and other networks (communication networks) and a telephone circuit and other communication circuits (communication lines).

The program described above may instead be a program that achieves part of the functions described above. The program described above may still instead be a program that achieves the functions described above when combined with a program having already been recorded in the computer system, that is, what is called a difference file (difference program).

The entire disclosure of Japanese Patent Application No. 2017-107110, filed May 30, 2017 is expressly incorporated by reference herein.

What is claimed is:

1. A robot controller comprising:
    a processor configured to execute computer-executable instructions to control a robot, the robot including an arm configured to move a discharger, the discharger being configured to discharge a discharge object to the target object,
    wherein the processor is configured to:
        receive information that a jig has been attached to the discharger, the jig being provided with a marker which indicates a position of landing of the discharge object;
        acquire an image captured by an imager, the image including the marker;
        calculate a position of the marker as a first position, the position of the marker being in the robot coordinate system, and the position of the marker being calculated based on the image;
        calculate a relative positional relationship between the position of the discharger and the position of the arm, the positional relationship being based on first correspondence information stored in advance and the first position, the first correspondence information being information representing a relative positional relationship between a position of the discharger and a fixed position of the marker when the jig is in a position attached to the discharger.

2. The robot controller according to claim 1,
    wherein the image captured by the imager is along an optical axis of the imager,
    the discharge object is discharged along a discharge direction of the discharger, and
    the processor is configured to move the arm so that an attitude of the imager and an attitude of the discharger cause the optical axis of the imager to be parallel to the discharge direction of the discharger.

3. A robot system comprising:
    a robot including an arm, the arm being configured to move a discharger, and the discharger being configured to discharge a discharge object to a target object;
    a jig provided with a marker, the marker indicating a position of landing of the discharge object, the marker being provided in a position on the jig that is farthest away from a discharging surface of the discharger in a discharging direction;
    an imager configured to capture an image including the marker;
    a control device including a processor, the processor being configured to execute computer-executable instructions to control the robot,
    wherein the processor is configured to
        calculate a position of the marker as a first position, the position of the marker being in a robot coordinate system, the position of the marker being based on the image;
        calculate a relative positional relationship between the position of the discharger and the position of the arm based on first correspondence information and the first position, the first correspondence information being stored in advance, and the first correspondence information being information representing a relative positional relationship between a position of the discharger and a fixed position of the marker when the jig is in a position attached to the discharger.

4. The robot system according to claim 3,
    wherein the image captured by the imager is along an optical axis of the imager,
    the discharge object is discharged along a discharge direction of the discharger, and
    the imager captures the image when an attitude of the imager and an attitude of the discharger cause the optical axis of the imager to be parallel to the discharge direction.

* * * * *